United States Patent [19]
Lemelson

[11] 3,854,889
[45] *Dec. 17, 1974

[54] AUTOMATIC PRODUCTION MACHINERY
[75] Inventor: Jerome H. Lemelson, Metuchen, N.J.
[73] Assignee: The Molins Organisation Limited, London, England
[ * ] Notice: The portion of the term of this patent subsequent to Apr. 11, 1984, has been disclaimed.
[22] Filed: Aug. 29, 1969
[21] Appl. No.: 858,560

Related U.S. Application Data
[60] Continuation of Ser. No. 629,758, April 10, 1967, abandoned, which is a continuation-in-part of Ser. No. 465,812, April 8, 1965, Pat. No. 3,313,014, which is a continuation-in-part of Ser. No. 152,702, Oct. 17, 1961, abandoned, which is a division of Ser. No. 449,874, July 28, 1954.

[52] U.S. Cl. .................. 29/33 P, 29/563, 198/19, 198/38, 214/1 BB, 214/1 CM
[51] Int. Cl. ..................... B23p 23/06, B23p 23/04
[58] Field of Search ............... 29/33.12, 563, 33 P; 214/1 CM, 1 BB; 198/19, 38

[56] References Cited
UNITED STATES PATENTS
2,782,691 2/1957 Feagans ........................... 90/13 R
2,883,912 4/1959 Billman et al. .................... 90/13 R
2,947,203 8/1960 Ausenda et al. ................... 29/33 X
3,280,659 10/1966 Allen ................................. 77/1
R26,770 1/1970 Lemelson ........................... 29/33

Primary Examiner—Francis S. Husar
Attorney, Agent, or Firm—Markva & Smith

[57] ABSTRACT

An automatic production system is provided having a plurality of program controlled machine tools and a conveying system for conveying different units of work to selected of said tools for performing pre-programmed operations on said work. The conveyance for the work comprises a plurality of work holding pallets or carriers which are selectively controlled in their movement to permit work to be transferred to selected machines while bypassing other machines. Each machine tool or selected of said tools may be varied in their operation to perform a variety of different operations on the same type or work or different kinds of work in accordance with command control signals generated by a program control device or computer provided, in one form of the invention, on the work carrier associated with the particular work transferred to the tool. In addition to providing a novel system for the automatic control of both conveying and production machinery serviced thereby, the invention also is directed to subsystems and cooperating components of the conveyance and the machines serviced thereby.

27 Claims, 21 Drawing Figures

INVENTOR.
Jerome H. Lemelson

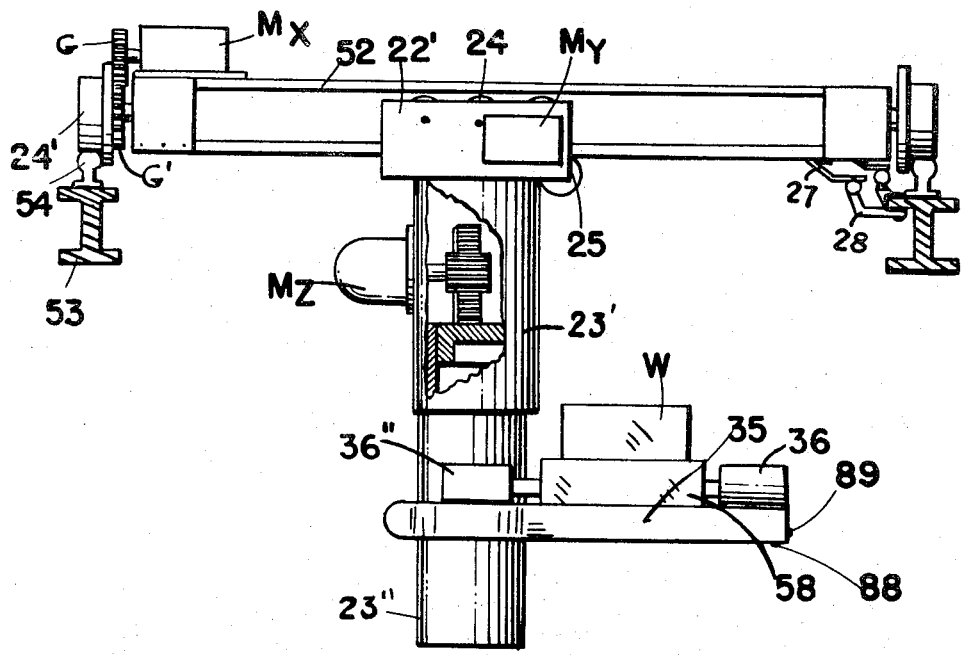
Fig.4
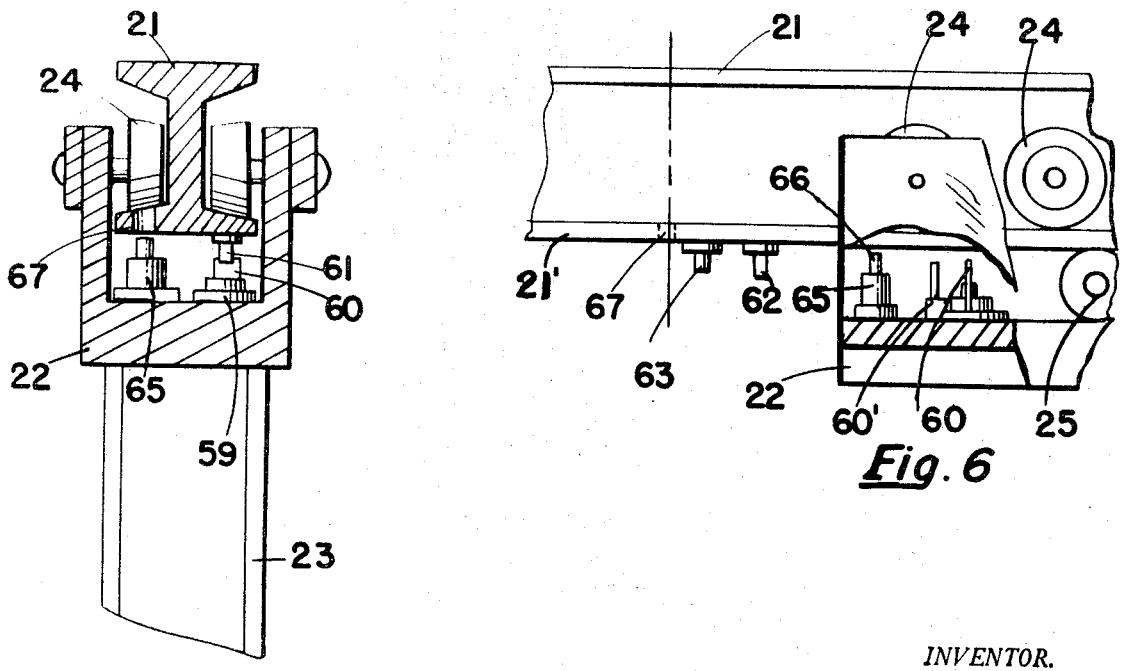
Fig.5
Fig.6
INVENTOR.
Jerome H. Lemelson

INVENTOR.
Jerome H. Lemelson

INVENTOR.
Jerome H. Lemelson

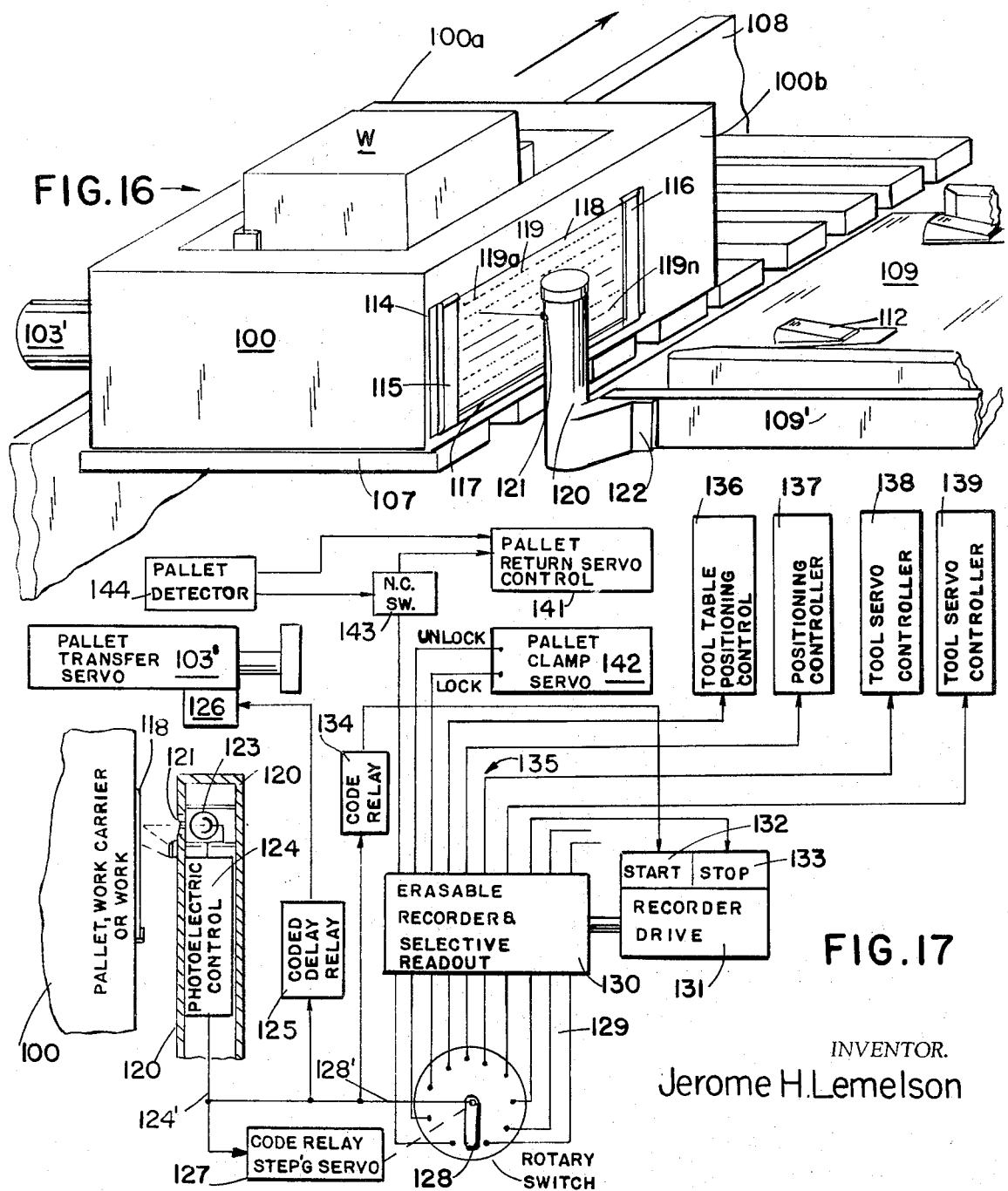

INVENTOR.
Jerome H. Lemelson

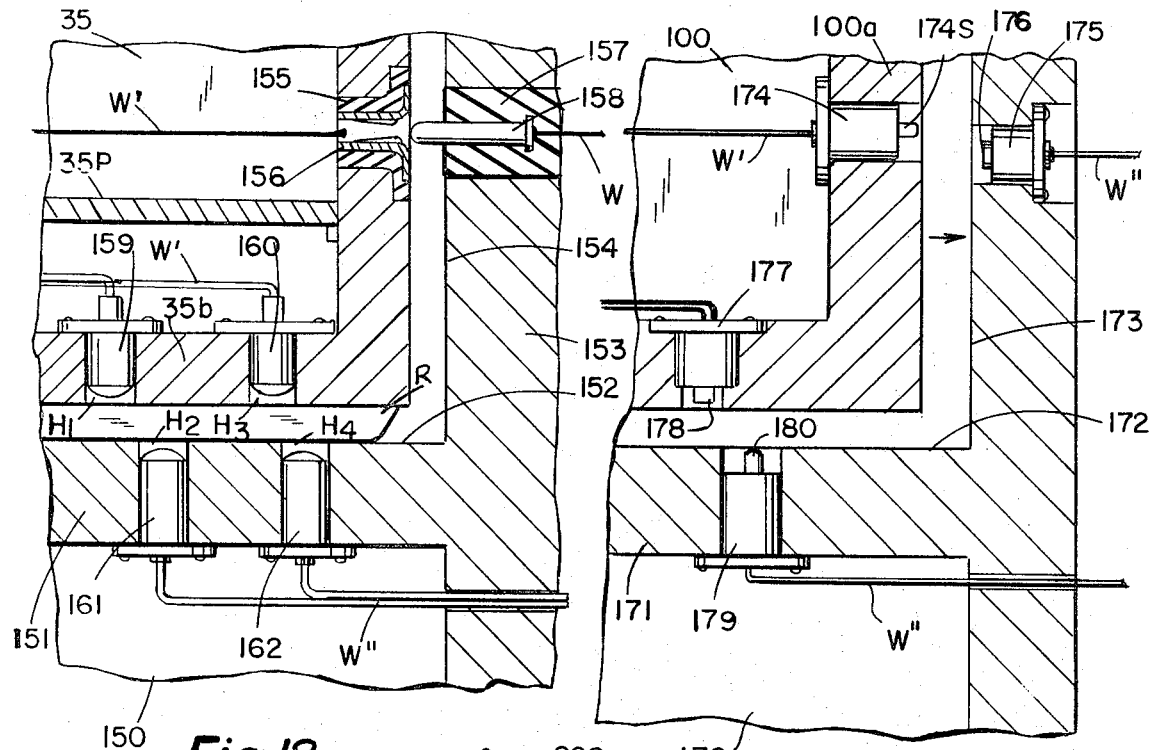
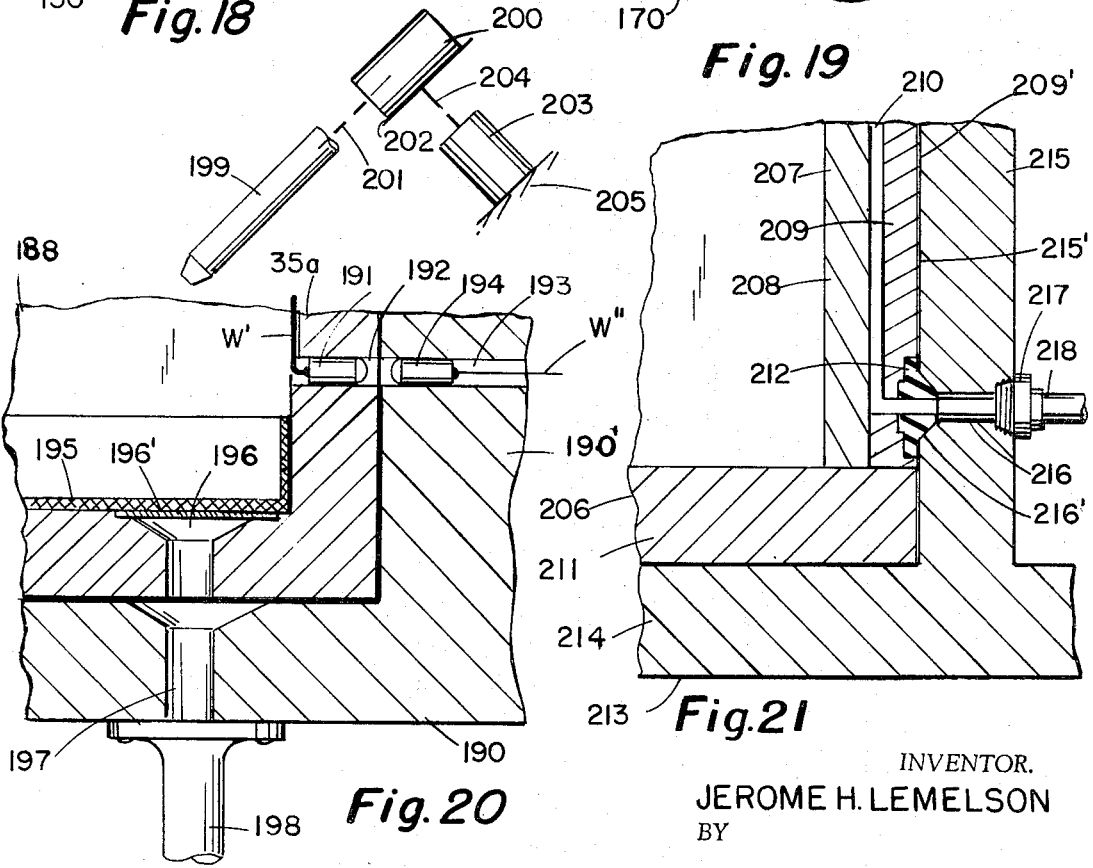

AUTOMATIC PRODUCTION MACHINERY

CROSS-REFERENCES TO RELATED APPLICATIONS

This is a continuation of my copending application Ser. No. 629,758 filed Apr. 10, 1967, now abandoned, which is a continuation-in-part of my copending application Ser. No. 465,812, filed Apr. 8, 1965, now U.S. Pat. No. 3,313,014, which is a continuation-in-part of my copending application Ser. No. 152,702, filed Oct. 17, 1961, now abandoned, which is a division of my copending application Ser. No. 449,874 filed July 28, 1954, now abandoned.

SUMMARY OF THE INVENTION

This invention relates to an automatic machine tool system of the transfer machine type employing a plurality of separately operable production machines which are capable of variable operation and a variable conveying system for transporting work-in-process to selected machines. Whereas the conventional transfer production machine is designed to perform a particular machining operation on the same work units to produce substantially the same units of finished or semi-finished product, the automatic production apparatus provided herein may be operative to finish many different types of work by performing selected operations in selected sequences which may vary from work unit to work unit. Accordingly, a single production line may be used to finish work units which would require different transfer machines or production lines. The operation of the production machinery provided herein is such as to eliminate the need for changing machinery set-up as each machine is automatically programmed to perform a particular operation on work when the work is present at the machine. A single machine of the production line may thus perform different operations on different units of work fed in succession thereto. The instant invention is also concerned with means for communicating between a control means or computer mounted on a work holding carrier and a machine tool to which said carrier transfers work transported by the carrier throughout the system.

It is a primary object of this invention to provide an automatic production system including a flexible transfer conveying line for work-in-process and machine tools serviced thereby which may be variably operated to perform a plurality of different operations on different types of work-in-process without the need to change tool set-up.

Another object is to provide an automatic production system employing a plurality of numerically controlled machines which are automatically loaded and unloaded with different units of work in any desired sequence and which are controlled in their operation by command recordings associated with each work unit and recorded on a recording member accompanying the work from machine to machine.

Another object is to provide an automatic production apparatus including a plurality of power operated devices each defining a different work station operative to perform different operations on work-in-process and a transfer conveying system for said work including a plurality of individual work holding fixtures which are adapted to hold and preposition work of different shape with respect to selected of said power operated devices, said apparatus including control means associated with each work holding fixture operative for the selection of work stations at which to stop and position a fixture and further operative to control the operation of machines at the selected work station.

Another object is to provide automatic machinery including improved means for communicating between a work carrier movable between work stations and a fixed command signal generating station or a variably controllable machine operative to cooperate with or perform operations on work held by said carrier.

Another object is to provide an improved automatic production system including a plurality of production machines and a conveying system including a plurality of carriers for transporting work in process to selected of said machines, said system including separate program controllers mounted on each of said carriers and operative to control operation of both the carrier and at least certain of said production machines.

Another object is to provide an automatic production system including a plurality of work stations containing variably operative apparatus, and a plurality of work holding fixtures selectively positionable with respect to each of said stations, each fixture containing program control means for the apparatus at said stations.

Other objects and advantages will be apparent from the following description, the appended claims and the accompanying drawings in which:

Figure 2:
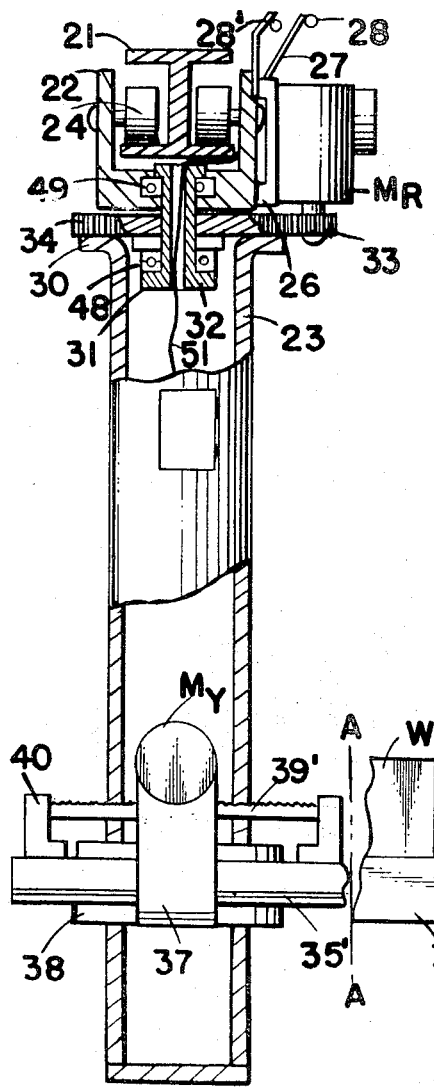
FIGS. 2 and 3 are views of a work transfer carrier applicable to the system of FIG. 1.
Figure 3:
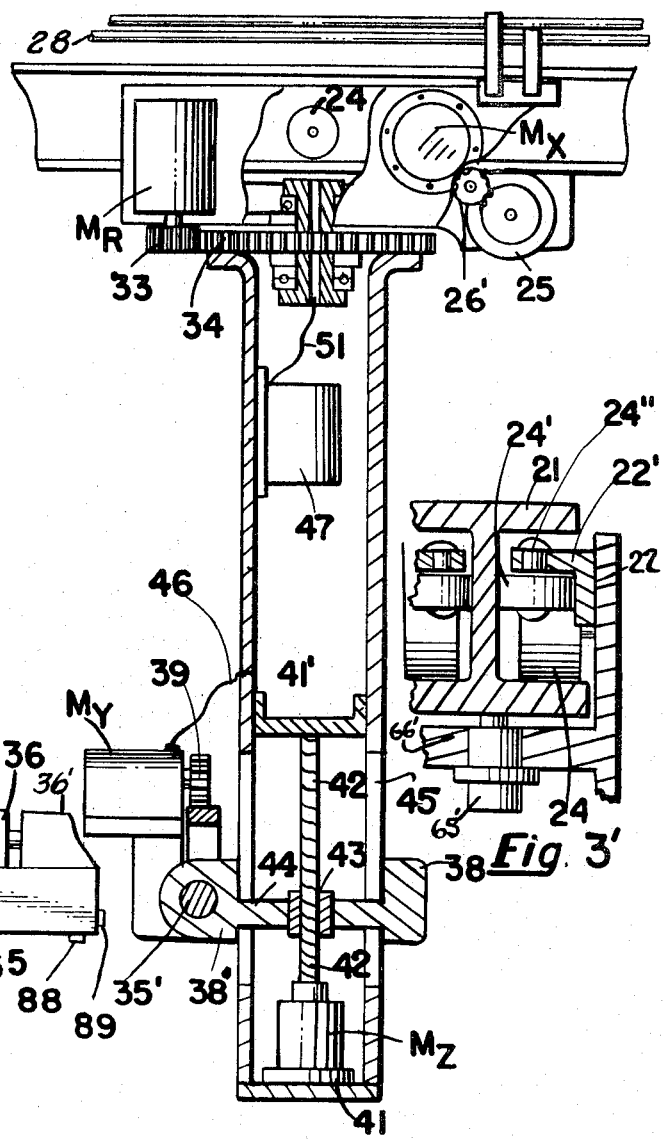
Figure 7:
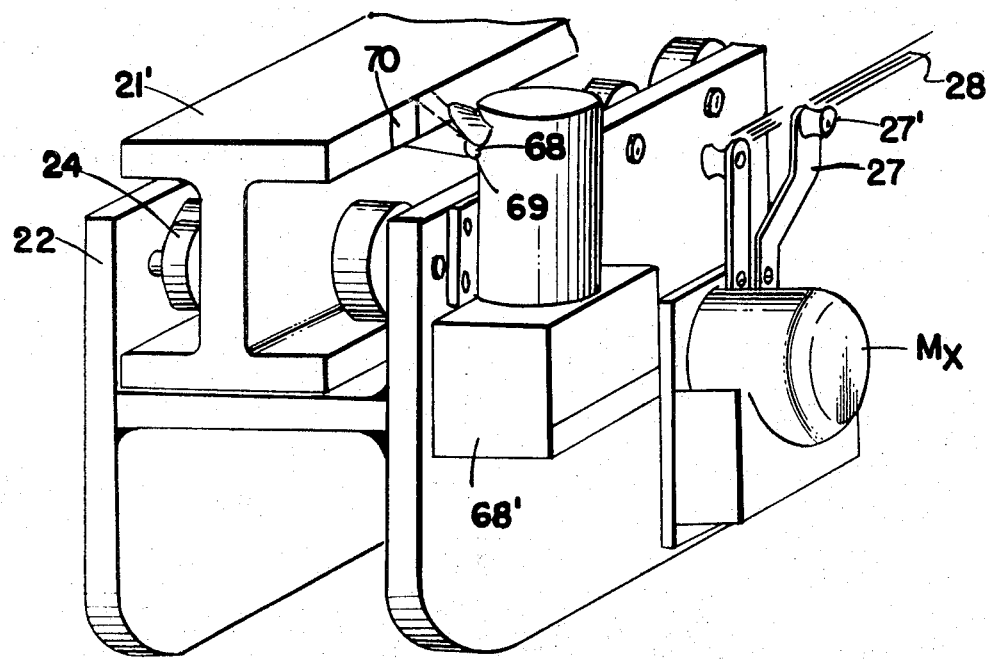
Figure 8:
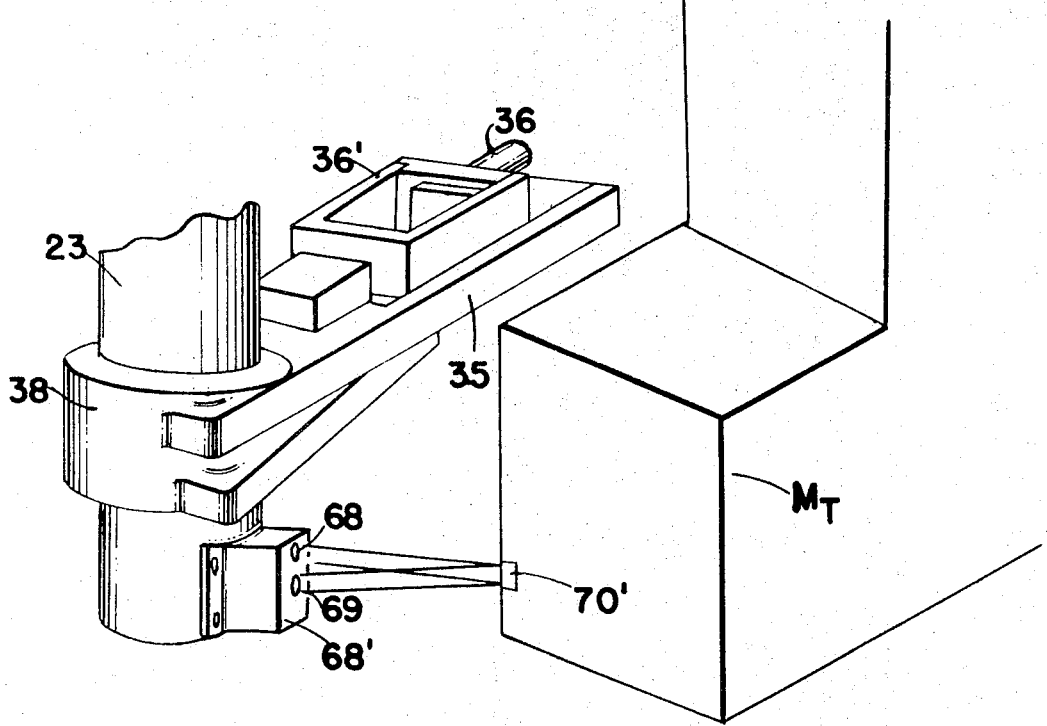
Figure 9:
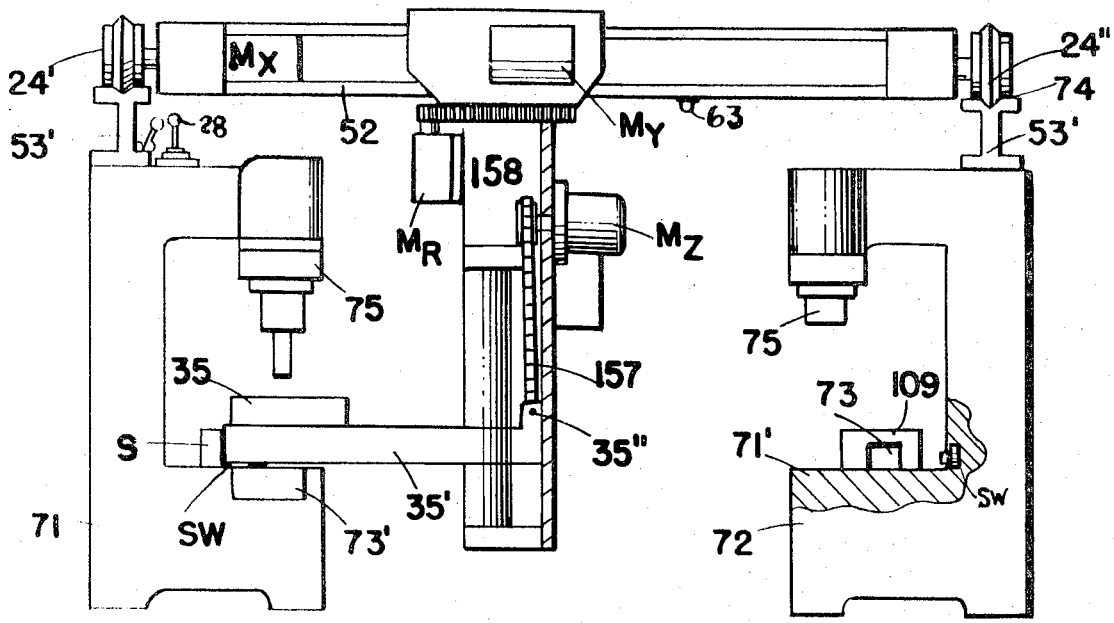
Figures 10, 11, 12:
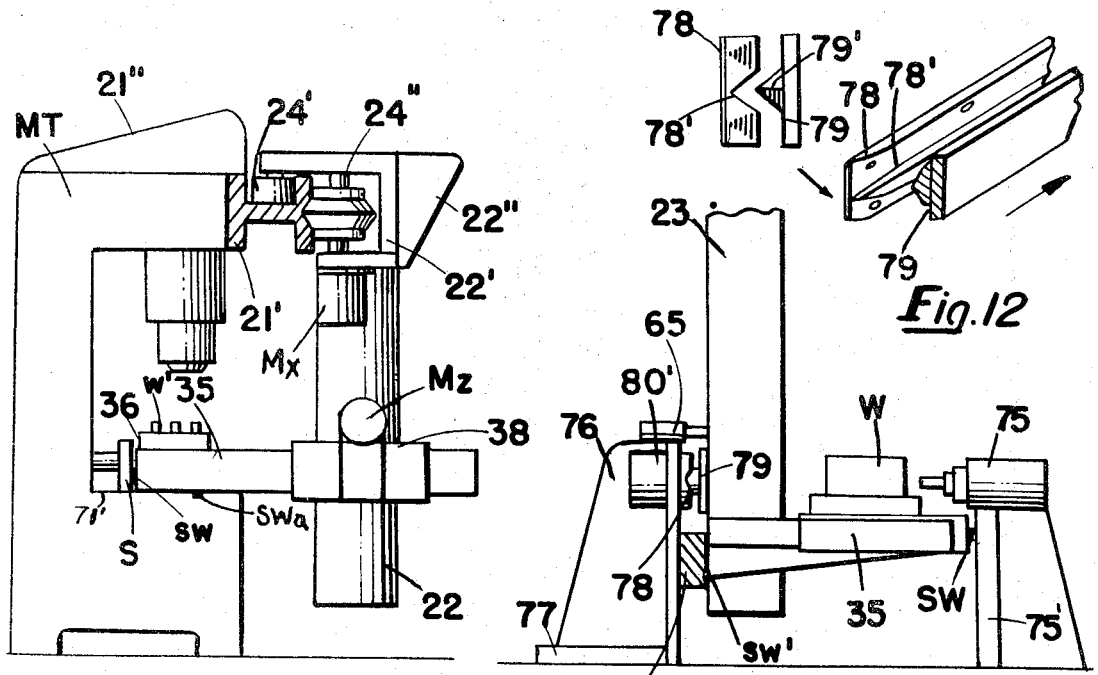
Figure 13:
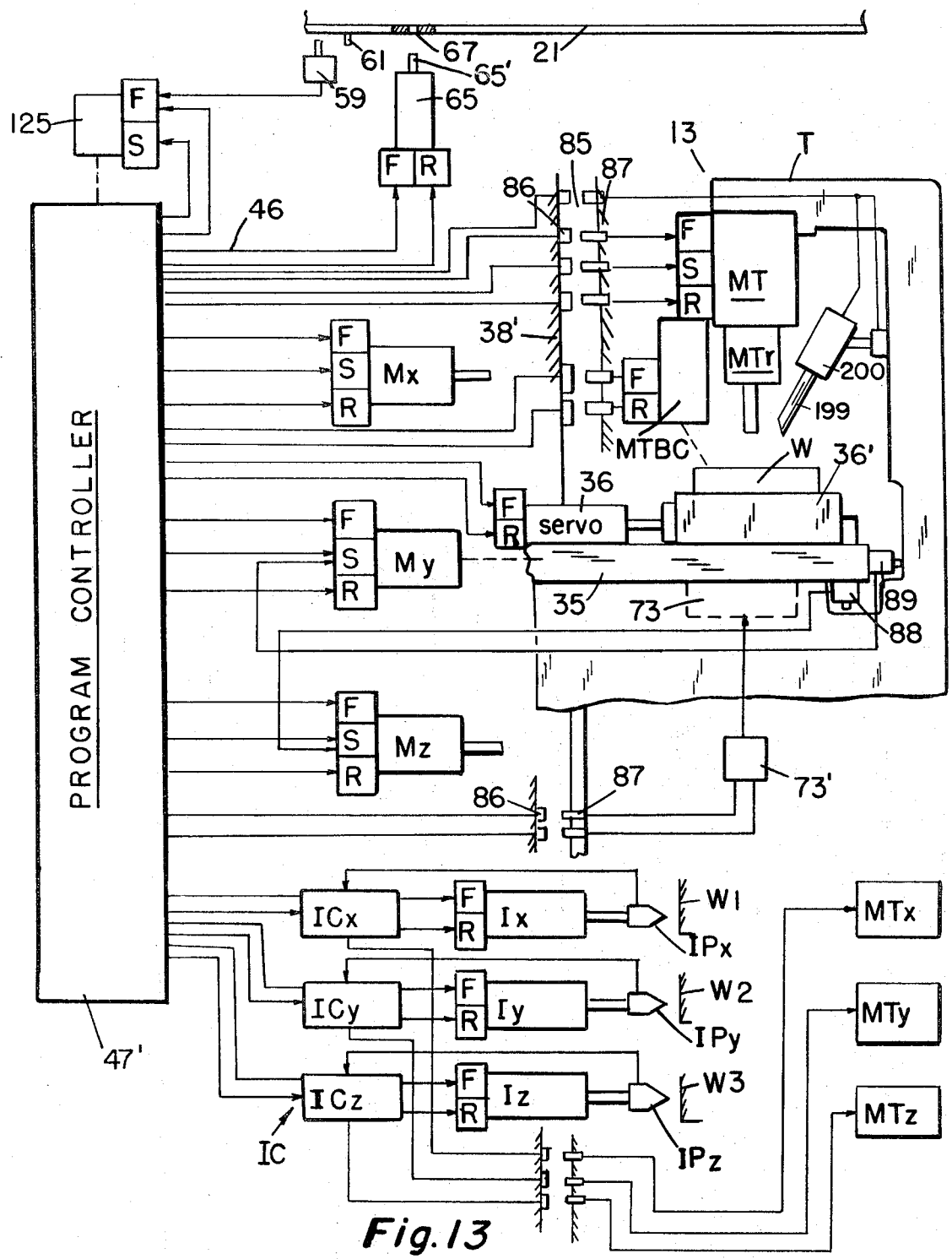
Figure 14:
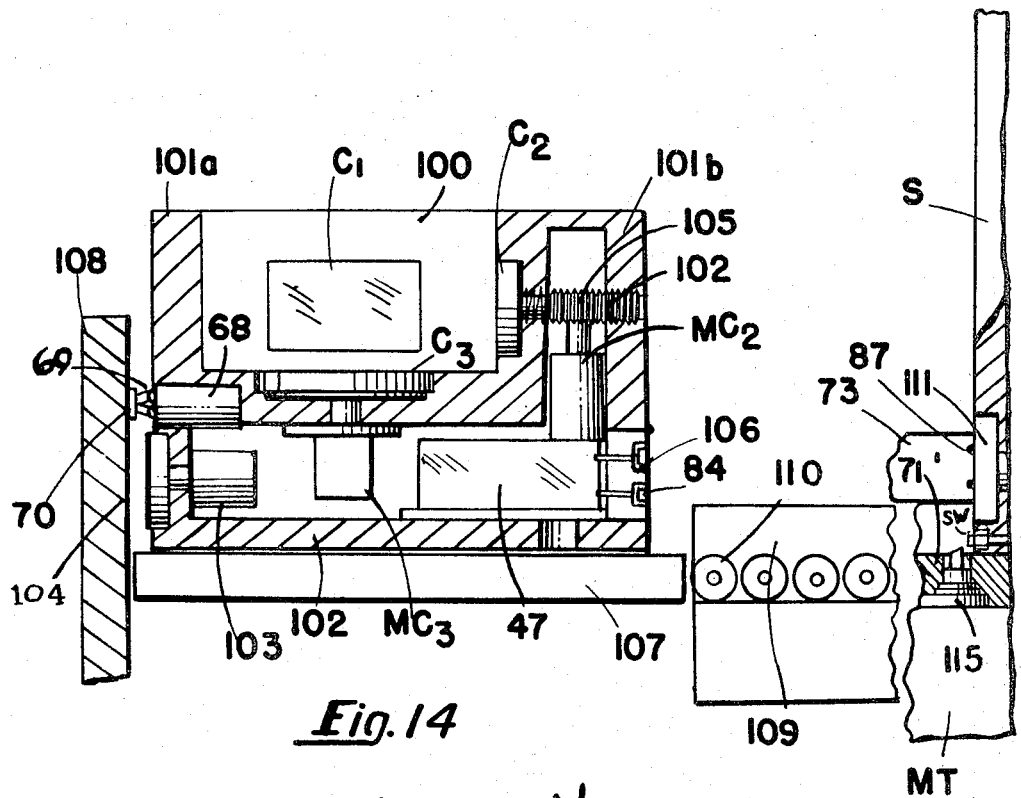
Figure 15:
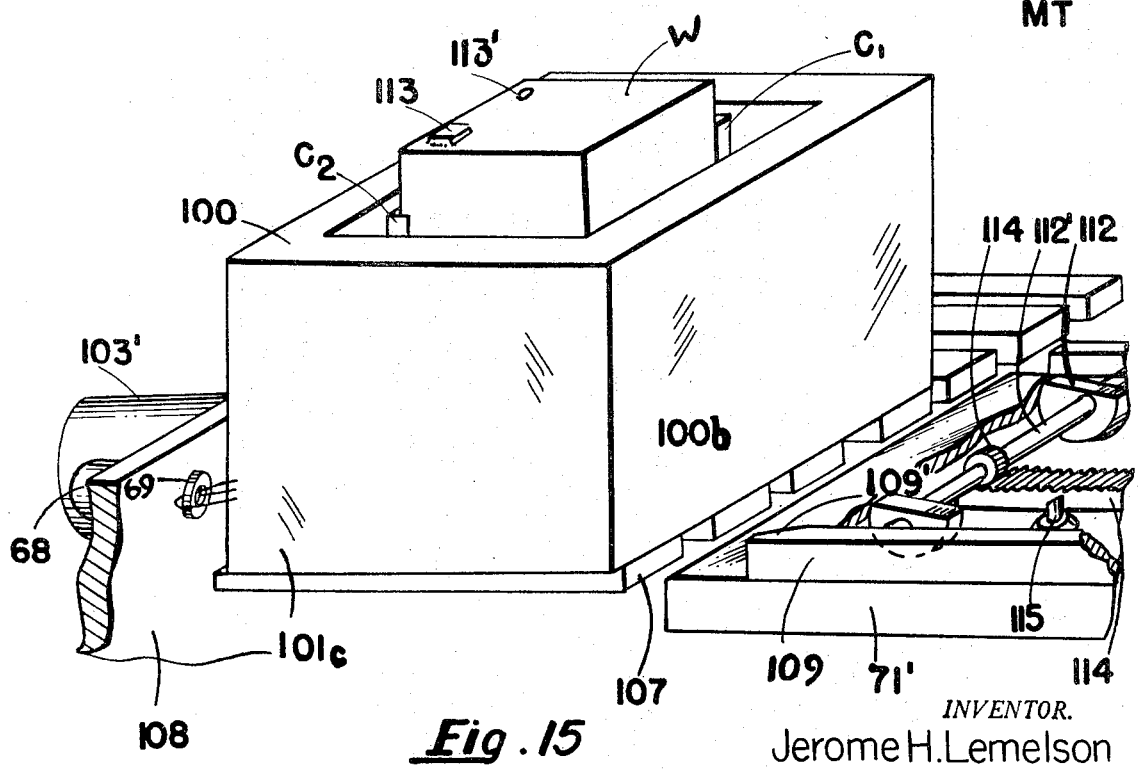

FIG. 3' is a view of a modification of part of the work transfer carrier shown in FIGS. 2 and 3;

FIG. 4 is an end view of a work transfer carrier with parts broken away for clarity employing a bi-rail conveying system;

FIG. 5 is an end view of a portion of a mono-rail traveling work transfer carrier showing control and locking means therefor;

FIG. 6 is a side view with parts broken away for clarity of the apparatus of FIG. 5;

FIG. 7 is an isometric view of a modified form of work transfer carrier showing means for scanning the guide means therefor for prepositioning the carrier;

FIG. 8 is a isometric view of a modified form of work transfer carrier showing means for scanning locations sensing means at a work station;

FIG. 9 is an end view of a modified form of the carrier illustrated in FIG. 4 shown at a typical work station;

FIG. 10 is an end view of a modified form of mono-rail carrier, support therefor and machinery at a typical work station;

FIG. 11 is a partial end view of a work transfer carrier at a production station showing further means for prepositioning and stabilizing the carrier;

FIG. 12 is an isometric view of a portion of the carrier prepositioning means of FIG. 11;

FIG. 13 is a schematic diagram of an automatic control system applicable to the automatic production apparatus of this invention;

FIG. 14 is an end view of a modified form of work transfer carrier and conveying apparatus therefore in the realm of this invention;

FIG. 15 is an isometric view of a modified form of the carrier and conveyor of FIG. 14;

FIG. 16 is an isometric view of a modified form of the work carrier of FIG. 15 and FIG. 17 is a schematic diagram of a control system applicable to the carrier and conveying apparatus shown in FIG. 16.

FIG. 18 is fragmentary view with parts sectioned for clarity of a work holding carrier and a machine serviced by said carrier showing two forms of communicative coupling means;

FIG. 19 is a fragmentary view of a work carrier and machine showing electro-mechanical coupling means between the two;

FIG. 20 is a fragmentary view with parts broken away for clarity of a carrier and work station showing coolant and cutting liquid flow accomodating means; and FIG. 21 is a fragmentary view in cross section of a portion of a work carrier and machine showing fluid coupling means between the two when they are in operative relationship with each other.

Figure 1:
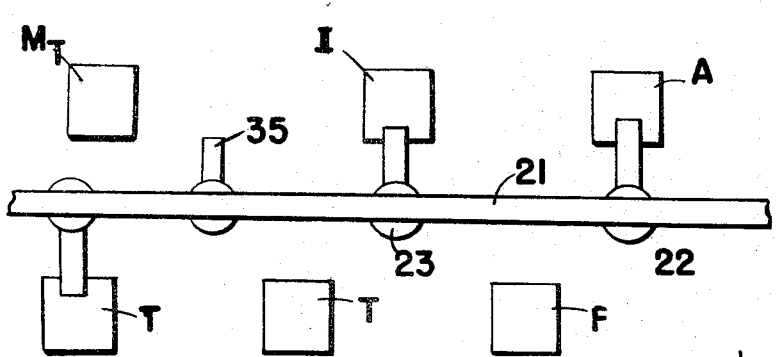
FIG. 1 is a plan view of a portion of an automatic production line showing a series of production machines and a plurality of work transfer carriers operative to preposition work in process at selected of said machines.

There is shown in FIG. 1 an automatic conveying system including means for automatically transferring work-in-process relative to a plurality of production and/or storage locations at which are located different machines for performing different operations on work conveyed thereby. A guide means or conveyor 21 is illustrated for conveying or guiding a plurality of fixtures or carriers designated 23, etc. relative to a plurality of work stations T at each of which is located one or more power operated devices or tools designated T, F, I, A which are capable of performing various operations on work prepositioned by or transferred thereto from the carriers 23. For example, T may represent a machine tool for cutting work; F a finishing tool such as a spray-paint applicator, polisher or buffer; I, an inspection tool or station; and A an assembly apparatus or station operative to assemble, weld or otherwise secure components or material to the work held by the carrier. While a perferred form of the conveying system is one in which notation 21 refers to a track such as an overhead monorail guide for a carrier movable thereon under its own power, other forms may include floor mounted tracks or other guide means for powered carriers, or any suitable powered or free conveyor along which the carriers 23 may be driven or caused to travel.

Means are provided in the system illustrated in FIG. 1 for automatically effecting the following functions and operations:

a. Prepositioning and retaining one or more units of work to be processed or operated-on on a carrier which is shaped or otherwise provided with means permitting it and the work held thereby to be prepositioned relative to any of the machines or equipment which is operative to perform on the work.

b. Controlling the movement of the carrier to selected work stations and prepositioning it at said selected stations by a variable programming means mounted on the carrier.

C. In those instances where the selected machine may be varied in its operation to perform different operations on a work-piece, variations in the setting, position, speed or other variable or variables associated with the machine may be preset, varied or controlled to change in accordance with a predetermined program by signals derived from a predetermined controller mounted on the carrier. The control action is accomplished by coupling the output of the carrier controlled with the controls for the selected machine when the carrier is at the work station of the machine preferably by mechanically coupling outputs of the carrier mounted controller with an input to the controls for the machine. In another form, the carrier programmer output is coupled to the input to the machine by means of a light source modulated by the programmer and detection means including a photo-multiplier tube or other electrooptical means coupled to the machine controls.

There is shown in FIGS. 2 and 3 details of one form of conveyor or carrier for a work piece W applicable to the production system illustrated in FIG. 1. The carrier 22 includes an overhead carriage 22' provided with a plurality of wheels 24 rotationally mounted thereon and operative to travel longitudinally along the overhead monorail track 21 for transferring the work from station to station or machine to machine as described. Supported by and depending downwardly from the carriage 22 is an assembly including a vertical column 23 and a fixture movable up and down the column including a platform 35 on which the work retaining means is mounted.

The carrier is power driven along the overhead track 21 by means of a reversible gear motor $Mx$ mounted on the carriage 22 and operative to rotate through gears 26' a wheel 25 which frictionally engages the bottom surface of the track 21 for moving the carrier therealong. Electrical energy for the various motors associated with the carrier is provided by means of a plurality of wires or slide bars 28, 28' which are insulatedly supported off and parallel to the track 21 and which are slidably engaged by brushes 27 mounted on and projecting from carriage 22.

The carrier illustrated in FIGS. 2 and 3 includes means for rotating the article handling components situated beneath the carriage 22. The upper end of column 23 is secured to a large circular gear 34 preferably having as a rotational axis the longitudinal axis of the column. A second reversible gear motor MR is shown secured to the side wall of the carriage 22 and is provided with a small circular gear 33 secured to its output shaft which engages the peripheral teeth of gear 34 for rotating same in either direction depending on the operation of the motor MR. Thus, work held by the fixture retained by column 23 may be rotated through a circular path for prepositioning same relative to a work station or machine.

Column 23 is rotationally supported by overhead carriage 22 by means of a hollow pin 31 having flared ends 32. The pin 31 passes through aligned holes in the bottom wall of the carriage 22 and the large circular gear 34 attached to the flared end 30 of column 23. Ball bearings 38 and 49 are disposed between the flared ends of the pin 31 and the respective surfaces of the carriage wall and the gear plate to facilitate rotation of the assembly. Pin 31 is provided hollow to permit a cable 51 to extend therethrough from wires connected to brushes 27 to provide power and control signals to the various servo motors and devices operative on the assembly including column 23.

Notation 47 refers to a housing for control apparatus such as a computer operative to generate command control signals for controlling the operation of the various servo motors associated with the conveyor and, in certain arrangements as will be hereinafter described, the operation of one or more of the machines or production equipment mounted adjacent the track or guide way 21 on which the carrier travels.

The fixture for supporting the work piece W includes a collar 38 which is slidably movable up and down the column 23 between predetermined limits thereon. Power operation of collar 38 and the work holding assembly secured thereto is effected by means of a reversible gear motor Mz shown mounted within the column 23 and having a long worm gear 42 secured to its output shaft and supported in bearing at its other end by means of a flanged plate 41' secured to the inside surface of the side wall of column 23. A bushing 43 provided with internal helical teeth is movably mounted on the worm 42 and supports collar 38 on column 23. A plurality of vertically extending slotted holes 45 are provided in column 23 through which extend spokes 44 connected to collar 38 and the helical gear collar 43. Thus, as motor Mz rotates, the helical gear formation on shaft 42 is operative to urge collar 43 longitudinally with respect to shaft 42, the direction of which will depend upon the direction of rotation of said shaft.

The platform 35 is shown movably supported with respect to column 38 on a cylindrical rod or beam 35' supported by 38 and extending outward therefrom. The platform 35 may be locked in a predetermined position along the cylindrical beam 35' or may be advanced and retracted thereon with respect to column 23 by means of a reversible gear motor My mounted on an extension 37 of the platform and having a pinion gear 39 connected to its output shaft which engages the teeth of a rack 39' supported off beam 35' along substantially the length thereof by a plurality of brackets 40. Notation 38' refers to the extension of collar 38 which supports beam 35'.

Also shown in FIG. 2 is a clamping servo device 36' mounted on the platform 35 and operative to advance and retract a clamp 36 against a surface of the work W. It is assumed that a stop or second clamp (not shown) is provided on platform 35 to retain the work W is predetermined position with respect to the platform 35 and to cooperate with the clamping device and prevent movement thereof during the clamping action. It is also noted that the notation W may refer to a fixture mounting one or more work pieces to a predeterminately positioned on platform 35 for locating same with respect to the machines or apparatus at the various work stations operative to perform various operations thereon.

Power to operate motor Mz is provided through wires (not shown) extending along the interior of the column 23 and power for operating motor My is provided by a flexible wire 46 passing thereto from the interior of the column as illustrated.

The apparatus illustrated in FIGS. 2 and 3 is subject to variation in its design and degrees of movement of the various components depending on the particular production requirements.

In FIG. 3' is shown a variation in the means for guiding the overhead carriage along the monorail track 21. The carriage 22' is provided with a plurality of wheels 24 operative to engage the upper surface of the lower flange of the I-beam track 21 and vertically positions the column assembly. To provide for lateral stability and prepositioning, a plurality of further wheels 24' are disposed to rotate about vertical axes on both sides of the vertical rib of the I-beam and engage respective opposite faces thereof. The wheels 24' are preferably four or more in number and are each supported by a bracket 22' extending inwardly from the vertical side walls of the carriage 22. Shafts 24'' support each of the wheels and are rotationally supported by brackets 22'. In a prefered form, the wheels 24' may each comprise ball or roller bearing which are operative to engage the opposite surfaces of the vertical rib of I-beam monorail track 21.

Further details of transfer conveyor apparatus of the type illustrated in FIGS. 2 and 3 and applicable to the automatic production system of FIG. 1 are illustrated in FIGS. 4 to 8. In FIG. 4, an overhead bi-rail conveying system is shown and the work carrier includes a bridge assembly including a beam assembly 52 with two pairs of wheels 24' rotationally supported at both ends thereof and adapted for moving the bridge and a carrier suspended therefrom, longitudinally along parallel overhead tracks comprising I-beams 53 and rails 54 disposed on top of each beam. A reversible gear motor Mx having a gear G on its output shaft is coupled thereby to a gear G' on a shaft extending between wheels at opposite ends of the bridge 52 for power driving the assembly along the overhead track arrangement. Movable along the I-beam 52 is a further assembly of the type provided in FIGS. 2 and 3 including a carriage 22' mounting a reversible gear-motor My for driving said carriage along track 52 and an assembly depending downwardly from 22' which is a modified form of the columnar assembly previously described.

In FIG. 4 a first tubular column 23' having an open lower end is fixedly secured to the bottom of carriage 22'. Movable in a telescoping manner within 23' is a second cylindrical column 23'' which supports the work holding platform and servo devices 36 and 36'' operative for positioning and/or clamping the work or its holding fixture in place on the platform. A reversible gear motor Mz mounted on the wall of column 23' is operative to raise and lower column 23' by means of a rack and pinion or other suitable means: Conducting wires 28 are shown insulatedly supported by one of the parallel tracks and are swept by brushes 27 insulatedly supported on the bridge for conducting power and control signals to the various mentioned servo devices. Notations 88 and 89 refer to limit switches or other sensing means situated at the end of platform 58 and operative to effect prepositioning of same as will be hereinafter described.

In one form of the invention, control of movement of the described overhead traveling carriages for prepositioning the work held thereby with respect to the various production devices of the system is effected by generating feedback pulses with movement of said carriage along its tracks and utilizing same to uncount one or more predetermining counters or otherwise affect cycle controllers. In FIG. 5 a plurality of limit switches 59 and 65 are shown secured to the top surface of the bottom wall of the carriage 22. The actuator arm 60 of switch 59 is operative to become engaged by pins 61 secured at selected locations along the bottom flange of the I-beam track 21 while the actuator arm of switches 65 rides against the bottom surface of the flange of 21 and activates the switch when it rides in and out of cavities or holes provided in said flange in the path of said actuator arm. Operation of either or both said limit switches may be operative to effect generation of signals for automatic feedback control of the position of the carrier or may be operative to effect stoppage of the motor driving said carrier along track 21 and initiation of a second control action by starting a further motor or motors associated with the described work positioning apparatus.

In FIG. 6, two pins 62 and 63 depend from the flange of the overhead I-beam track 21 and cooperate in precisely positioning the carriage 22 at a selected position on said track. A first pin 62 is operative to effect actuation of one of the limit switches mounted on the carriage 22 which activates control means for slowing down the motor driving the carriage in the direction of the limit defining stops while a second pin 63 situated beyond pin 62 is operative to deflect the actuator of a second of said limit switches for precisely stopping carriage 22 after it has been slowed down. More precise positioning control is thus possible as the inertia of the carrier has been substantially reduced due to the reduction in speed prior to stopping. Notation 65 may also refer to a lineal actuator such as a solenoid having a projectable shaft 66 operative to be projected into hole 67 in the I-beam flange upon becoming aligned therewith for precisely aligning carriage 22 and the work positioning apparatus therefore.

FIG. 7 illustrates further means for effecting positional control of the carriage along the overhead track 21 and includes a photoelectric relay including a light source 68 adapted to project a beam of light against the edge of the upper flange of the I-beam 21' which light is reflected back to a photoelectric cell 68 situated adjacent the light source when reflective markers or strips 70 situated on said flange edge are intersected by said light. A pulse is thus generated at the output of a photoelectric controller 68' which may be used for stopping a motor or uncounting a predetermining counter for effecting positional control as described in U.S. Pat. No. 3,119,501.

In FIG. 8 is shown an arrangement whereby the sensing device comprises a photoelectric cell 69 and light source 68 mounted adjacent each other in the same housing 68' which is secured to the lowermost portion of the vertical column 23 and is positioned so as to scan reflective markers 70' disposed on adjacent machine tools or devices MT situated along the route of the carrier supporting the work-in-process. Feedback signals are thus generated when the light from the light source 68 is reflected by the reflective markers 70' back to the photoelectric cell 69 which becomes energized thereby and generates an output which is fed to the predetermining counter or positional controller described herein.

The sensing device situated in housing 68' is thus operative to sense the presence of a particular machine or production device in the path of travel of the carrier and to generate a signal for further controlling the carrier and movement of the work held by the fixture 36' supported by the platform 35 extending outward from the column 23.

The signal so generated may be operative to effect change in the direction of movement of the carrier components thereof or, in the simplest form of control, effect braking or stoppage of the various servo motors so as to preposition the work in alignment with the production tool or device adapted to scan or operate thereon. Depending on the nature of the automatic control device or programmed work positioning computer, the exact mode of control initiated or effected when the cell 69 senses light reflected from the marker 70' will be responsive to the signal generated by said sensing means.

Various automatic production setups applicable to the apparatus of the type herein provided are illustrated in FIGS. 9–11. In FIG. 9, a modified form of the apparatus shown in FIG. 4 is illustrated and is operative for positioning a work holding fixture 35 with respect to either or both illustrated production machines 71 and 71'. The machines which may comprise any form of production device include power operative devices 75 and 75' such as motor driven drills, mills, grinders, inspection devices or other forms of tools each of which are shown mounted on a C-frame with the two frames situated laterally aligned with each other and spaced apart a sufficient degree to permit passage therebetween of the work holding carrier. A plurality of such machines are preferably paired in alignment with each other along a production line and define two rows of machines the frames of which are operative to support the overhead tracks or rails 53' along which the wheels 24 and 24' of the bridge crane mounting the work holding carrier travel. In other words, the frames or supports for the production machines themselves are operative to support the work holding carrier during its travel from station to station of the production line.

The carrier of FIG. 9 is shown prepositioning the work holding fixture 35 with respect to machine 71 and is rotatable on the overhead carriage thereof which moves along track 52 so that the work held in fixture 35 is also positonable with respect to the machine tool 71' situated across the aisle from 71. Notation 72 refers to the base or bed of the machine tool which is operative to support the laterally extending arm 35' on which work holding fixture 35 is mounted. When it comes to rest, arm 35' is disposed on the upper surface of the bed 72 so that the major portion of the vertical forces applied to the work by the machine tool is resisted by the bed of the tool rather than arm 35'.

Notation 73 refers to means situated on the bed 72 of the machine tool for prepositioning and locking arm 35' in place during machining or other operations applied to the work. Thus, if forces are applied to the work which are other than vertical, resistance to movement thereof will be effected by the device 73. Device 73 may comprise automatically operative clamps such as solenoid or motor actuated devices which engage arm or platform 35' upon its movement to a predetermined position at the machine tool or production device and are operative to clampingly retain said arm and/or the fixture 35 in a predetermed location with respect to the tool or production device. Notation 73' refers to an electro-magnet situated in the base of the frame for tool 71 which is automatically operate to magnetically attract and retain arm 35' thereagainst during the machining or other production operation on the work.

Other features of FIG. 9 include a stop S operative to preposition the platform with respect to the machine tool frame and a limit switch SW located on the machine tool frame and positioned to become engaged by advancement of the end of the platform 35' thereagainst for initiating operation of the machine tool and/or the means clamping the platform 35' against the upper surface of the machine tool bed 72. In FIG. 9, vertical movement of the platform 35' is effected by means of a sprocket drive means operated by motor Mz which drives a chain or belt 157 connected to the platform 35' to raise and lower same. FIG. 10 illustrates another form of the invention in which the work carrier is modified and is operative to travel along a single track supported by the frames of various production tools defining the production line. The production tool MT is shown having a C-frame supporting an I-beam 21' extending outward from the upper portion of the frame and secured to a plurality of similar frames or tool supports. The overhead carriage 22' for the carrier is modified so as to support a plurality of wheels 24" which rotate about vertical axes and engage the outer face of a flange of the I-beam track 21'. Further wheels 24' are supported for vertical rotation and engage the underface of a flange of track 21' to vertically align column 22. One or more of the wheels 24" are power operated by a motor Mx secured to the upper portion of column 22. Brackets 21" and 22" respectively provide additional support for the track 21' and carriage 22'. The work W' shown in FIG. 10 comprises a plurality of small parts which are prepositioned on the arm 35 by means of a part holding fixture 36 which is so located that the small parts W' are prepositioned at the machine tool when the end of arm 35 engages an adjustable stop S which is prepositioned on the upper surface of the base of the C-frame.

FIG. 11 shows further details of means for prepositioning a carrier with respect to a production station. A V-block 79 is secured to the carrier column 23 or platform 35 and is operative to engage in a V-way 78 secured to a prepositioning column or mount 76 having a base 77 which is bolted or otherwise secured to the floor of the production area or device. The V-way 78 is so positioned as to precisely locate the platform 35 with respect to a production device 75 shown having a tool aligned with the work W. A sensing device such as a limit switch SW' or other suitable means is located near the lower end of column 23 and is opeative to sense the presence of a prepositioning block 80 which serves as a bucking means for supporting column 23 during machining operations on the work held by platform 35.

FIG. 12 shows further details of the V-block 79 and V-way 78 described. The V-block has a wedge shaped protrusion 79' which is operative to engage in the V-channel 78' in 78 which is shaped so that 79 may slide therein from either end of the V-way 78. In other words, the ends of the V-way 78 are tapered to receive the wedge 79' as illustrated. In FIG. 11, an electromagnet 80' or other suitable clamping device as described may be mounted on column 76 and is operative to engage and retain V-block 79 within V-way 78 upon alignment of the two. The device 80' may also be mounted on the column 23 of the work carrier and is controlled to either operate automatically by means sensing the presence of the carrier or a signal from the computer 47.

FIG. 13 shows one form of automatic control system applicable to the apparatus herein described. The system illustrated utilizes a cycle controller 47' such as a tape or card reader, or multi-circuit timer driven by a constant speed motor 125 and having a plurality of output circuits 46 each of which may become energized during a predetermined time or plurality of times in a production cycle to activate motor controls and the like to effect prepositioning of the carrier and work held thereby with respect to one or more production machines and, in certain instances, control the apparatus at selected work stations in a manner to effect predetermined operations on said work.

In describing a typical cycle of operation of the apparatus by the means illustrated in FIG. 13, it is assumed that the described overhead track traveling carrier is approaching a work station containing a machine or device adapted to perform operations on work W carried thereby. The limit switch 59 mounted on the overhead carriage is activated by marker device or pin 61 supported by the overhead track and a first control signal is generated thereby which is transmitted to the start control F of motor 125 operating sequential controller 47'. A plurality of outputs of multi-circuit timer or card reader 47' thereafter become energized in sequence to effect the various described operations which include prepositioning of the work relative to the production device or tool at the particular station and, in certain instances, operation of the device T in a predetermined manner to perform predetermined operations of the work. A first pulse from 47' may be transmitted to the stop control S of motor Mx and another pulse to the activating control F of a clamping device such as a solenoid 65 operative to engage the overhead track 21 and lock the carriage in position thereon by projecting its actuator shaft 65' against the flange of track 21 to clampingly engage same and/or be forced into an alignment hole 67 therein as described to predeterminedly position and prevent movement thereof during operation on the work is such a function is necessary. A third output of the sequential controller 47' may next be operative to energize the forward control F of motor or servo My which is operative to move the platform 35 in a direction towards the production device or machine Mt which movement continues until limit switch 89 mounted at the end of platform 35 engages a stop or surface of the base of the machine tool MT. Actuation of switch 89 is operative to generate a pulse for energizing the stop control S of motor My to arrest forward movement of the platform 35 with the work prepositioned at the machine tool MT and further prepositioning of 35 may be effected by energizing another output of the controller 47' connected to the drive control F of motor Mz which lowers or raises platform 35 until limit switch 88 engages a stop or surface of the machine tool bed. Activation of switch 88 is operative to generate a pulse which is transmitted to the stop control S of motor Mz further prepositioning the platform with respect to the tool.

At this point, the tape or card reader 47' may be operative to generate control signals for activating the controls of the work clamping servo 36 if it is desirable to remove the work W and/or its holding fixture 36' from platform 35 at the machine device MT for further prepositioning the work thereat but such operation may be selective for certain machines and will depend on whether or not the control circuits extending from 47' to the controls of the work clamping servo 36 are actually activated.

Also illustrated in FIG. 13 is a device 73 operative to retain, by clamping engagement, magnetic attraction or suction means, the platform 35 of the work handling conveyor against the bed of the machine tool so as to further assure that the work held thereby will not shift or move during operations thereon in an undesired manner. The device 73 is operated by a control or servo 73' such as a motor, fluid ram or the like which is controlled by signals generated on control inputs thereto which extend as outputs of the card or tape reading device 47'.

Also illustrated in FIG. 13 are means for coupling respective control outputs of the cycle controller 47' with inputs leading to the production device or machine tool MT for controlling same in a predetermined manner to perform predetermined operations on a particular work piece W carried to the work station by the described conveyor. As hereinbefore described, means are provided for coupling outputs of the automatic controller or computer mounted in the housing 47 supported by the work transfer conveyor or work holding fixture. Such coupling means 85 include a plurality of coupling devices 86 such as receptacles or plugs mounted on the platform 35 or an extension thereof and terminating respective output circuits of the multi-circuit program controller 47'. The terminals 86 are operative to electrically couple with respective terminals 87 supported on a common base which preferably is secured to the machine tool or platform therefor in a position to be aligned with the platform 35 of the work conveyor when the latter is advanced thereagainst as described by the operation of one or more of the motors M$y$ and M$z$. The outputs of coupling devices 87 extend to respective forward, reverse and stop controls F, S and R of the production device or machine tool MT so as to predeterminedly effect control of operation thereof by signals generated by the program controller 47' mounted on the work conveyor.

Upon terminating the particular operational cycle associated with the production device at which the work W is prepositioned, a signal is generated on an output of controller 47' which is operative to energize the stop control S of motor 125 after signals have been generated to energize control for reversing or deactivating the various described clamping, positioning and production machine servos. The termination of the particular cycle is preceded by activating the reverse controls for either or both servos M$y$ and M$z$ and the forward drive control F of motor M$x$ so as to cause movement of the work conveyor along the overhead track 21 to the next production tool or station. Thereafter, upon activation of the switch or sensing device 59, the controller 47' is operative to effect either a new cycle of control operations to preposition the work holding fixture and/or operate the next production device or tool along the production line or to effect bypassing said next production device by merely maintaining the forward drive control F of motor M$x$ energized without activating any of the other described controls for the various servos provided in FIG. 13.

Also illustrated in FIG. 13 are inspection means in the form of a plurality of transducers or probes designated I$x$, I$y$, I$z$ and C which are operative to sense different surfaces of the work piece or work holding fixture to effect inspection thereof after the operation performed by the particular production device or machine tool. Each of the sensing devices or probes is provided with a respective probe head designated by notations I$px$, I$py$, I$pz$, etc. which is movable towards a particular work surface by controlling the operation of a servo motor associated with the probe and operative to advance and retract same. Each of the servo motors is controlled by a computing device such as a predetermining counter, such devices being denoted IC$x$, IC$y$ and IC$z$ in FIG. 13. Such computing devices or predetermining counters are preset or otherwise controlled by signals generated by the program controller 47' mounted on the work carrier and transmitted thereto at a predetermined interval or intervals during the controlled cycle or operations through the coupling means 85 established when the work holding platform or fixture is positioned as described at the work station.

Movement of the probe heads I$px$, I$py$ and I$pz$ is operative to generate feedback signals which are passed to the respective positional control computers IC and which, in turn, may be operative to control operation of respective motors operating and positioning the machine tool or tools at the work station and denoted MT$x$, MT$y$ and MT$z$ in FIG. 13. Such motors may be operative, for example, to drive and preposition the machine tool or its mount in a plurality of different directions to perform different operations on the work. The notation MT$r$ refers to a motor operative to rotate or otherwise operate the machine tool at the work station which tool is also moved in a predetermined path by predetermined operation of the tool positioning motors MT$x$, MT$y$, and MT$z$. Said motors as well as a tool mounted work moving or clamping servo MTBC are operative in response to respective signals generated by the command control programmer 47' mounted on the carrier or work holding fixture and transmitted to their controls through the coupling means 85 so that the cycle of operation of the tool may be primarily a function of the program recorded in the controller 47' which may be varied merely by varying the characteristics of said recordings so that different operations may be performed by the same tool or production device on different types or work.

The servo positional probes IP$x$, IP$y$ and IP$z$ thus may be used to locate various surfaces of the work by contact therewith or otherwise sensing said surfaces and provide feedback signals which are used to predeterminedly control tool movement and operation during the initial operations on the work and/or continuously during the operation of the tool. The tool motors MT$x$, MT$y$ and MT$z$ may be operative to drive or control the position of the tool with respect to the work and/or move the work W with respect to the tool T if released from work holder 36' by the unclamping operation of servo 36. Control of said motors may be effected by pulsing stop, start and reverse controls F, S and R thereof with said pulses generated by predetermining counters in control devices IC$x$, IC$y$ and IC$z$ which counters are preset by pulse trains transmitted to each from program controller 47', or by other signal means generated by device 47'.

In FIG. 13 the work station illustrated is broadly defined as having any type of production machine T such as a machine tool employing one or a plurality of motors to preposition, move and operate one or more tools or the like associated therewith. Accordingly, notation MT is the broad term presented to represent one or a plurality of servo motors or the like operative to position and power the tool or tools at the work station for controlled operations on work prepositioned by the carrier for the work. Therefore the three circuits illustrated as extending from respective outputs of the program controller and coupled to the controls of the production machine MT may actually comprise circuits which are greater in number than those illustrated for controlling various other servo devices (not shown) but associated with the production machine T which may comprise a plurality of motors, solenoids, and other electrically operated or controlled production and work securing or prepositioning means. In other words, one or more tools may be positionable by a plurality of servo driven or servo controlled means which are in turn controlled by the signals derived from the program controller 47' as generated in reading a card, tape, disc or recording drum or by other means therein operative to generate command control signals of predetermined characteristics at predetermined times in a control cycle.

It is assumed in FIG. 13 that the correct electrical power supplies are provided on the correct sides of all switches, servo controls and the like to assure proper functioning of the described apparatus.

FIGS. 14 and 15 illustrate details of conveying apparatus for work-in-process including a work holding carrier 100 operative to travel along a flight conveyor 107 or the like past a plurality of production machine tools for performing various operations on work held thereby. Means are provided for transferring the work holding fixture 100 to selected of a plurality of machine tools disposed adjacent the conveyor 107. The production station or machine tool of FIG. 14 is referred to by the notation MT and is shown having a roller conveyor 109 extending thereto as a branch disposed lateral to the main transfer conveyor 107. The plurality of rollers 110 of the branch conveyor 109 may be gravity or power operated to receive and transfer the work carrier 100 to the machine tool or production device MT, preferably in response to signals generated by a program controller, as described, which is mounted in a housing 47 supported in the base of the carrier 100.

Features of the work carrier 100 illustrated in FIGS. 14 and 15 include rigid side walls 101a and 101b, end walls 101c and 101d and a bottom wall 102. A partition divides the carrier into two volumes or sections, one for securing one or more articles of work to be held by the carrier and the other for retaining one or more work clamping devices, computing, detecting and coupling devices. Notations C1, C2 and C3 refer to respective clamps which are movable from the walls of the upper portion of the carrier against respective surfaces of the work to clampingly engage and hold same. Each of said clamps are projectable and retractable by respective servo devices such as push-pull solenoids or reversible motors two of which MC2 and MC3 are shown operatively coupled to the clamps C2 and C3 for projecting same against the side and bottom surfaces of the work in cooperation with clamp C1 to preposition and retain the work in the upper chamber portion of the carrier 100.

A housing 68 mounting a photoelectric cell and light source is shown in FIG. 14 supported by the side wall 101a of the carrier and is operative to scan reflective markers 70 disposed along the side wall 108 of the conveyor for identifying different work stations in the system. Signals generated by the photoelectric relay in housing 68 each time the photocell thereof detects a marker 70 are transmitted to a control or computing device located within the housing 47 for effecting the transfer of the carrier 100 to selected machine tools. In FIG. 14 each carrier is provided with its own power supply or battery mounted in housing 47 and is deflected by a lineal actuator 103 such as a solenoid mounted on side wall 101a and operative to project a ram shaft thereof against the surface of the side wall 108 of the conveyor under the control of the computing device situated within housing 47 in response to signals generated by the scanning device 68 in the manner hereinabove described for controlling the servo devices of the overhead track travelling carrier.

In FIG. 15 the carrier 100 is transferred from the main conveyor 107 to the branch conveyor 109 by a lineal actuator 103' such as a pneumatic or hydraulically operated ram which operates in response to a signal generated by photoelectric scanning means 68 scanning reflective markers or the like located on the outside of side wall 101a of carrier 100. In other words, in FIG. 15 the carrier 100 is transferred by the application of scanning means located at the side of the main conveyor 107 detecting selectively positioned markers or codes on the carrier. If features of FIG. 14 are combined with those of FIG. 15, transfer of the carrier may be effected by a combination of deflection actions affected by transfer devices 103' located at the side of the conveyor 107 and the transfer device 103 located within the carrier 100.

Further features of the apparatus illustrated in FIG. 14 which may also be applied to the apparatus of FIG. 15 include pluggable electric coupling connectors 84 located on the side wall 101b which are operative to engage and be electrically coupled to respective connectors 87 situated at the machine tool to which the carrier is transferred when said carrier has been moved along conveyor 109 to a particular location or stop position thereat so that signals generated by the program control means located within 47 on the carrier 100 may be transmitted to electrical control apparatus located at the production machine tool MT for controlling same to operate on the work in a predetermined manner as defined by the program control device or devices mounted within housing 47. The machine tool MT is provided with a work prepositioning platform or fixture 71' and a plurality of clamps, one of which 73 is illustrated for clampingly engaging the carrier 100 so as to preposition same with respect to the tool. A limit switch 115 is mounted within the base of the tool receiving platform 71' and has an actuator arm operative to be compressed upon movement of the base of carrier 100 thereagainst. Activation of switch 115 is operative to cause one or more of the servo driven clamps to engage, move and preposition the carrier 100 with respect to the machine tool and may also be operative to initiate operation of the machine tool on the work held by the carrier 100.

In FIG. 15 a clamping arrangement is illustrated which includes a shaft 112' driven by a motor operated rack 114 engaging a pinion 114' secured to shaft 112' in response to activation of a limit switch 115 by the movement of the carrier 100 thereagainst whereafter, a plurality of cam shaped clamps 112 mounted on the ends of shaft 112' engage the outside wall 101a of 100 and force said fixture into position against a stop such as wall S situated at the machine tool for prepositioning the carrier thereat.

It is noted that the control system provided in FIG. 13 may also be applied to systems employing conveyor traveling fixtures of the type illustrated in FIGS. 14 and 15, it being merely necessary to omit servos Mx, My and Mz from the control diagram, FIG. 13.

FIGS. 16 and 17 illustrate a modified form of the invention particularly of that form illustrated in FIG. 15 wherein an automatic production system is provided employing a plurality of work carriers or pallets 100 which move along a main conveyor 107 and are transferred automatically therefrom to different machines. Whereas in FIGS. 14 and 15 each work carrying pallet or carrier 100 contained its own program controller 47 operative for selectively locating the pallet at selected machines and, in certain instances, operative also to control the variable operation of machines to predeterminately operate on the work held by the pallet, in FIG. 16 the carrier 100 contains a coded member 118 which is predeterminately located along the wall 100b thereof such that code recordings thereon may be read by reading devices located at each work station. The devices reading the codes on the coded member 118, which is illustrated as an oblong card in FIG. 16, are operative to generate coded output signals as the member 118 is scanned during its movement past each reading device and the output signals, depending on their nature, are operative to control one or more operations such as transfer of the carrier or pallet to the branch conveyor 109', positioning and clamping of the pallet and/or work at the machine associated with said branch conveyor and, when the machine is a tool which is variable in its operation, predetermined control of said machine elements to perform preprogrammed operations on the work.

While the record member 118 may contain any suitably readable markings such as magnetic marks or recordings which are scannable by transducing means brushing same as the pallet moves past the reading means, in FIG. 16, the codes thereon are provided as a plurality of optically scannable marks disposed along different parallel horizontal rows of the card 118. Optical scanning means in the form of one or more photoelectric cells 123 located in a housing 120 which is shown secured by a bracket 122 to a side wall 109' of the branch conveyor 109 at the receiving or upstream side thereof, are provided to scan one or more lines of code recordings, designated 119a to 119n, which scanning results in activating a photoelectric control and amplifier 124 the output of which generates codes which are fed to the various control means illustrated in FIG. 17 for controlling movement of the pallet and machine operation.

As each line or groups of lines 119 of the scannable coded marks on card 118 are recorded so as to be associated with a particular machine tool or work station located along the conveyor 107, the photoelectric scanning means in each housing 120 may be located at such a height so as to scan only those codes associated with the station or branch conveyor at which the particular scanner is located. If the scanner in housing 120 scans a level of the card 118 which has not been provided with scannable markings, then no output signal will be generated as the carrier 100 moves past the scanner and no action will be taken to transfer the carrier from the main conveyor 107 to the branch conveyor. The record member 118 or card for all carriers are located and temporarily held in a frame 114 having slotted side guides 115 and 116 and a bottom guide 117 in the form of a U-shaped frame which is loadable from the top, which frame is so positioned that the coded cards of all carriers have their leading edges a predetermined distance from the leading end wall 100a of the pallet and their recording tracks 119a – 119n predetermined heights from the bottom of the pallet and the top surface of the flights of the conveyor 107 so that suitable operation of the pallet transfer servo 103' may be initiated when the pallet is in proper alignment with the associated branch conveyor and the proper line or lines of coded recordings may be properly read by the scanner as the pallet is conveyed therepast.

In FIG. 17 a single photoelectric cell 123 receives light through a slotted hole or aperture 121 in the housing 120 and scans reflective markers as codes printed on the card 118 to intermittently energize the photoelectric control therefore, designated 124, which generates pulses on its output 124' which are used to energize a plurality of coded relays or relays responsive to pulses of particular durations depending on how the codes are recorded on the card 118. The card 118 may contain reflective sheet material such as Scotch Lite which is retroreflective or may be a punched card backed with a sheet of said retroreflective material to provide light pulses to the photoelectric cell 123 when light from a light source directed from the housing is reflex reflected thereto and interrupted by opaque marks or the card itself. A first part of the scanned marker code is operative to activate a delay relay 125 which is either coded or responsive to a signal of longer time duration than the others generated on output 124' and generates a signal on its output at a time when the carrier 100 is aligned with branch conveyor. The output of relay 125 is then passed to a control 126 activating the pallet transfer servo 103' which may comprise a pneumatic or hydraulic ram cylinder operative to push the pallet 100 onto the branch conveyor 109.

The coded output of control 124 is also passed to a second code responsive relay 134 and a portion of said code is operative to energize said relay which pulses the start control 132 for a gear motor 131 driving an erasable recorder 130 including a drum or endless loop tape and magnetic or other suitable erasable recording material. To effect control of the various servos and devices associated with the station at which the scanner 120 is located, various portions of the code message existing on the line or lines of recordings of member 118 scanned, are gated to associated channels of the multichannel recorder 130 by passing said series code to the input 128' of a rotary stepping switch 128 which is stepped to gate said code portions on selected of the outputs 129 of said switch. The stepping device 127 comprises a coded relay connected to a stepping servo which is connected to the shaft of the rotary switch by a ratchet-pawl mechanism (not shown) and rotates the brush thereof in synchronization with the generation of the different portions of the coded message intended for controlling the particular machine apparatus at the station associated with the scanner generating said codes. The outputs 129 of the stepping switch 128 are connected to respective recording transducers which record said code portions on respective channels of the recorder 130. The recording drum or endless tape on which said multi-channel recordings are made is preferably driven at such a speed and is of such a dimension that the reproduction heads thereof which are adapted to reproduce from each of the channels receiving recordings from the recording heads that said code signals are generated in the desired sequence on the outputs 135 thereof. One of the first signals generated on an output of the recorder 130 is passed to a pallet clamp servo 142 at such a time delay that the pallet has been transferred to the position at the machine or table therefore that operation of said servo by said signal will lock the pallet in place as hereinbefore described. Thereafter, signals are generated and passed in sequence to positioning controllers 136,137, etc. which are operative to move the clamped or locked pallet in a predetermined path or paths while work is performed thereon by the tool and other signals are passed to control the machine tool itself by properly activating or coding tool servo controlers such as 138,139 and others if necessary. The controllers 136–139 may be provided in accordance with conventional digitally operated machine tool command control means and may be pulse-train or binary digital signal controlled with or without employing feedback signal control means therefore depending on the nature of the control desired thereby.

As the exact nature of operation of the machine tools is not the subject of this invention, it is sufficient to state that codes and/or pulses generated on the outputs 135 of the recorder 131 are operative to either directly control the various machine tool, conveying, locking and unlocking servos by activating the start and stop controls therefore or to predeterminately set up or program automatic control means therefore of a simple nature or having the complexity of a digital positional control computer to cause the machine or machines at the particular station to perform predetermined operations on the work.

Upon termination of the machining or other operations such as inspection, finishing and assembly operations, signals are generated on the outputs 135 of the recorder 130 extending to the unlock input of the pallet clamp servo 142 to cause unclamping or release of the pallet and the start input to a servo 141 operative to effect return travel of the pallet along branch coneyor 109 to the main conveyor 107.

The various code responsive relays described may also be operative in response to signals of particular time durations as generated by scanning marks of particular length along the recording member 118. Although not illustrated, it is assumed that the correct sources or power supply are provided on the correct side of all relays, servos, controls and the like to properly operate the apparatus of FIG. 17. Also the apparatus of FIG. 17 may be operative in controlling the positioning of a self powered carrier such as the type illustrated in FIGS. 2 and 3 at selected machine stations and the operation of the machines thereat assuming, for example, that the record card 118 is predeterminately mounted on all carrier platforms 35 or the column 25 so as to suitably scanned as the carrier passes the scanning station and that suitable means are provided for electrically coupling the stop and start controls for the carrier drive motor(s) with the output of each recorder 130 at each station and energizing said controls in the proper timing when signals are generated on the proper outputs of said recorder before and after the machine operation on the work held by the carrier.

While complete details of the control means 136–139 for the tool table and tool positioning and operating means are not illustrated in FIG. 17 further details of an automatic production system employing a plurality of machine tools which are controlled in their operation by digital signals derived from scanning a recording member to generate command messages, recording said messages on selected channels of a magnetic recorder and selectively reading out said messages and gating portions thereof to selected machine tool elements, may be found in my copending applications Ser. Nos. 387,954 filed Aug. 6, 1964, now issued as U.S. Pat. No. 3,372,568 and 219,357 filed Aug. 13, 1962, now abandoned.

To prevent interference of the pallet returning from the machine tool conveyor 109 to the main conveyor 107 with a pallet which may be passing the work station at the same time, the operation of the transfer means or pallet return servo 141, the output of the recorder 130 extending to the pallet servo control 141 is connected thereto through a normally closed switch 143 which is activated to open in the event that another pallet is aligned with the discharge end of conveyor 109. A limit switch or photoelectric detector 144 situated at the end of conveyor 109 may be energized by the presence of a pallet thereopposite and, when so activated, may be operative to open the normally closed switch 143. Upon becoming deactivated, switch 144 which may be of the override type or connected to a suitable logical switching control, may be operative to activate the pallet return servo control 141 preferably after a suitable time delay by means of a delay element in the circuit to assure that the pallet passing the end of branch conveyor 109 has completely cleared same before the pallet thereon is released to conveyor 107. Suitable switching means may also be provided to stop conveyor 107 in the event that a pallet thereon is to be transferred to conveyor 109 while the machine thereof is in operation.

Variations in the hereinbefore described and illustrated automatic production apparatus are noted as follows:

I. Certain, if not all, of the power-operated devices or tools T, F, I, and A which are illustrated in FIG. 1 as being provided adjacent the track or conveyor 21 for operating on work-in-process fed thereto by carriers 35 or other suitable means traveling said track or conveyor, may each contain one or more preprogrammed control means such as multi-circuit timers or a control computer containing a plurality of recorded programs which may be selectively reproduced to predeterminately control the power-operated device of each in accordance with the nature of the work being fed thereto or moved therepast. The selection of which particular controller or recording program to operate the tool may be effected in accordance with means for identifying the work being fed thereto which may comprise a scanning means mounted adjacent the tool itself or an identifying means associated with the work or its carrier and operative to either selectively activate a scanning means supported adjacent the tool or to generate and transmit signals to a receiver at the tool including means for using said signals to select a particular command control message associated with the tool automatic control system. In other words, while the preferred embodiment heretofore described in the specification comprises the provision of command control recordings on cards or other recording means associated with each carrier, more complex command sequential control signals for the tool itself may be generated by a computer located at the tool that is selected by means located on the carrier.

The means described for selectively positioning work-in-process at selected machine tools may be utilized with a system as defined in the above paragraph or identifying means associated with each tool may be employed to selectively effect the stoppage of selected carriers at selected tools by electrical coupling means of mechanical means projectable into the path of the carrier as it passes the tool.

II. In another mode of operation, one or more recording members such as cards or other devices containing cutouts, magnetic recordings, printed or other means in the form of a plurality of analog or digital recordings, may be provided on each carrier to be transferred to or scanned by a reading device at each machine tool as the carrier comes into alignment therewith for not only selectively positioning the carrier and/or transferring work therefrom to the selected machine tools but also controlling operation of said selected tools to predeterminately effect a sequence of production operations on work transferred along the production line.

III. In a third mode of operation, a central computer may be operatively connected by wires, shortwave transmitter and receiver means or coupled by modulatable light beam generating means to all of the variable machine tools, input means to sequential controllers mounted on the carriers, means for feeding work-in-process to the carriers and means for unloading work from the carriers and transferring said work to storage or a distribution point. In other words, more complex forms of the disclosed automatic production system may be provided which may include features of the described system and auxiliary means for controlling not only the operation of the variable machine tools with respect to the work, but also the means for controlling the rate-of-flow and the selective positioning of the work in the system.

IV. The described command control device 47 mounted on the carrier may include a card reading unit accessible to the outside of the carrier so that cards containing recordings which are operative when reproduced to effect control of the carrier movement throughout the system in the operation of one or more of the tools thereof, may be easily loaded therein by hand or by an automatic card handling device past which the carrier moves just prior to or after loading the associated work to be processed as the carrier moves through the system.

The control unit or computer 47 may also contain an erasable recording member such as a magnetic recording disc or drum which is programmed by the receipt of command control messages operative, when reproduced therefrom, to control the positioning of the carrier and the operation of one or more of the automatic machine tools T, reference being made to my aforementioned copending applications Ser. Nos. 387,954 filed Aug. 6, 1964, now issued as U.S. Pat. No. 3,372,568 and 468,418, now abandoned, for details of such a remote control system for automatic machine tools. In other words, in such a system, a central computer may be employed to transmit separate command control messages to each of the carriers in accordance with the particular work in process to be conveyed thereby to the system and a recorder on each carrier may be utilized to record said messages which are thereafter reproduced in selective parts as the carrier moves through the automatic production system. Each message recorded in a carrier recording unit contains, as described, message segments for not only selectively stopping the carrier at selected machine tools or otherwise operating same to predeterminately position the work held thereby with respect to the tool but also may contain message segments which are operative when reproduced after the carrier is selectively aligned with a tool, to effect the automatic control and operation of said tool for predeterminately operating on the work held by the carrier.

V. If a recorder is provided as part of the control unit 47 mounted on each carrier, it may receive preprogrammed messages to be recorded therein by electrical contact coupling of wires extending therefrom to contact members which engage other contact members at a particular position adjacent the path of travel of the carrier whereby said other contact members are operatively coupled or connected to the output of a computer or device operative to generate the different command control messages for controlling the path of travel and machine tool operation necessary to predeterminately perfrom on different units of work fed through the system.

VI. Coupling between the output of a message generator or computer and the various carriers travelling the system may also be effected by utilizing a command control message to modulate a light beam and directing the light beam at a photoelectric receiver mounted on the carrier which is coupled to either a recording member associated with the carrier controller 47 or directly to the controls for the means driving and stopping the carrier. In the latter arrangement a light beam directed at the carrier from a home location or plurality of locations situated adjacent the production line or trackway 21 may be operative to control not only the movement and stoppage of the carrier at selected machine tools but also the operation of said selected machine tools to predeterminately perform operations on the work transported by the carrier to the machine tools.

VII. While in FIG. 16 the carrier or pallet 100 is provided properly aligned on conveyor 107 and become aligned thereon by engagement with conveyor railing 108 which it travels parallel to permitting proper reading by the photoelectric readers 120, suitable pallet deflecting means may be provided above the conveyor for guiding the pallet close to the reader when it reaches the reading station. Systems employing magnetic recordings, magnets or punched cards replacing card 118 on the pallet and suitable magnetic or mechancial switch reading means disposed to engage or sense the code recordings as the pallet passes the reading station may also be utilized. Also, fluid amplifier reading means may be used to fluidically sense holes in coded array in such a recording member and/or projections in the wall of the carrier as it passes the reading station.

FIGS. 18 to 21 illustrate further details of means for effecting communicative coupling between a work carrier such as the powered carrier illustrated in FIGS. 2 and 3 or the pallet type carriers of FIGS. 14 and 15 and a machine tool of the type described when the carrier arrives at the machine as described. In FIG. 18 the carrier 35 which may comprise a pallet or the described powered platform, is shown just prior to being positioned with its bottom and end walls abutting the surfaces 152 and 154 of the platen 151 and end wall 153 of the machine tool bed 150 above or to the side of which are positioned one or more powered devices of the types described for operating on the work meld by the carrier 35 but not shown in the drawing. Electrical coupling is effected between the programmer, controls and/or one or more electrically operated devices mounted on the carrier 35 by means of a plurality of pluggable connectors provided respectively mounted on the end wall 153 of the machine tool and the end wall of the carrier 35. In FIG. 18 a female electrical receptacle 156 is insulatedly retained in a cavity in the wall of carrier 35 by a bushing 155 of insulating material and is positioned to receive a pin 158 which is secured in a resilient bushing 157 which is secured in a cavity in wall 153. In the drawing, the carrier 35 has not made contact with the surface 154 of wall 153 but the vertical position of the carrier is substantially defined by engagement of the bottom surfaces of a plurality of ways or runners R with the surface 152 of the wall 151 as the carrier slidably moves thereover towards the wall 153. Once against said wall, electrical contact pin 158 is electrically connected to receptacle 156 so that one or more conductors or wires W'' extending to or from control devices located at the machine tool are electrically connected to one or more wires W' extending to or from electrical control devices located on the carrier as described. A plurality of the plug-receptacle electrical connectors so illustrated may be provided as respective banks of contacts on the carrier or pallet and machine tool bed for the mating connection of respective circuits as illustrated in FIG. 13.

Also illustrated in FIG. 18 are photoelectric coupling means for effecting communicative coupling between the carrier and machine tools serviced thereby. Secured in respective holes $H_1$ and $H_3$ provided in the bottom wall 35b of the work carrier 35 are a modulatable light source 159 and a photoelectric cell 160 adapted to become respectively aligned with a photoelectric cell 161 and a modulatable light source 162 which are respectively provided in holes $H_2$ and $H_4$ of the tool bed wall 151 of the machine tool bed 150, when the carrier is in operative relationship with respect to the machine tool. Thus by modulating the light from source 159 in accordance with signals generated by a computer or controller such as that mounted in the carrier housing 47, the photoelectric cell 161 of the machine tool aligned therewith will be correspondingly modulated and will generate an output signal on its output lines W'' which may be used to either control one or more machine tool elements or to preset or program a computer or control device at the machine. Similarly, feedback or command control signals generated by or at the machine tool may be communicated to the computer or other control device associated with the carrier by using said signals to modulate the light source 162 associated with the tool bed 150, the modulated light from which modulates the output of the photoelectric cell 160 of the carrier aligned therewith. Thus two way communication between the carrier and machine tool may be effected to automatically control the servo motors of the tool and/or the carrier to effect the desired automatic operation as described. Notation 35P refers to a partition separating the lower portion of the carrier from the upper working volume thereof to protect the wiring and photoelectric devices although said devices and wiring may be secured externally of the carrier wall or within said wall.

FIG. 19 shows a modified form of the invention in which two way communication between a carrier and machine tool serviced by said carrier may be effected by means of solenoids and limit switches. Shown secured to the bottom wall of the carrier 100 is a limit switch 177 having its switch operating actuator 178 exposed to the exterior of the carrier by being recessed in an opening in said wall in which said switch is secured. The carrier 100 is shown just prior to being positioned against the locating surfaces 173 and 172 of the machine tool bed or platen 170 above which the tool which operates on the work held by the carrier is located. Situated in an opening in the horizontal wall 171 of the bed 170 is a solenoid 179 having its projectable actuator shaft 180 normally disposed beneath the surface 172 so as not to interfere with movement of the carrier 100. Wires W'' extending from one or more electrical circuits associated with the machine tool such as including one or more limit switches, controls or logical switching elements, are connected to the operating coil of the solenoid 179. when the solenoid 179 is activated by a control pulse its actuator 180 projects to engage the actuator 178 of switch 177 which switch is connected to one or more of the described controls for devices located on the carrier such as means for operating a record readout device or operating one or more motor controls to further position or remove the work from the vicinity of the machine. The carrier 100 is also provided with a solenoid 174 operative to project its shaft 174S when pulsed by signals generated by one or more devices mounted on the carrier such as switches, controls or the described computing device 47. Shaft 178 engages the actuator 176 of a limit switch 175 when the carrier is properly aligned at the machine, and the switch 175 is operative to pulse one or more controls or a programming device as described for control of the machine thereafter in performing predetermined operations on the work.

FIG. 20 shows a form of the invention employing a work holding carrier 188 of the free of self powered type for holding and transporting work-in-process between machines at least certain of which machines include tooling for performing operations in which the work is cut or otherwise changed in shape by material removal therefrom. The carrier 188 is provided with a drain opening 196 in the bottom wall thereof which is sloped towards said drain so that cutting or coolant liquid such as cutting oil or the like may flow out said drain. When the carrier 188 is properly aligned at the machine tool bed 190 as described, the drain 196 is in alignment with a drain hole 197 provided through the horizontal wall of the tool bed which hole extends to a pipe 198 which is preferably connected to a filtering a recirculating or disposal system for said liquid. If chips are developed in the machining operation, a removably perforated metal insert or pan 195 may be provided in the bottom of the carrier 188 which pan may be automatically removed and emptied after each cycle or number of cycles from the carrier. The carrier, work holding means thereof and machine tools are preferably designed so that all waste, chips and the like are removed from the machine by the carrier and are preferably located thereon such as in the pan 195 such that they may be easily removed therefrom after the work is removed from the carrier or during a production cycle without disposing said waste on any of the machines serviced by the carriers. Also illustrated in FIG. 20 are a photoelectric cell-light source combination denoted 191,194 for coupling the carrier and machine tool by means of a modulated light beam connected to one of the two and a light receiving means connected to the other. The light is projected along a horizontal path by mounting said source and photocell in holes 192 and 193 bored horizontally in the carrier and end wall 190' of the machine tool base 190.

Also shown in FIG. 20 is a pipe or nozzle 199 through which air or work cutting or tool lubricating liquid is conducted for direction against the area of the work held by the carrier or pallet being machined. The nozzle 199 terminates a fluid supply system including valve and/or pump means for initiating flow of said fluid therethrough. A first servo 200 such as a lineal actuator is operatively connected to advance and retract the nozzle 199 with respect to the work held by the carrier for properly positioning the end of said nozzle to predeterminately direct fluid therefrom against the work. A second servo motor 203 has its output shaft 204 connected to the mount 202 for the motor 200 for rotating said actuator and the nozzle held on its actuator shaft. Further servo motors (not shown) may be provided to move the nozzle in other directions to provide three or four axis control of the position of the fluid ejection nozzle 199. Operation of these servo motors and the valve or pump means for controlling fluid flow through the nozzle is preferably effected under control of the described program controller or a control computer associated with the carrier or tool to predeterminately position the nozzle and effect control of the flow of said fluid(s) thereafter. The nozzle 199 may also contain a plurality of passageways and means for ejecting both air and cutting oil from the end thereof to effect proper lubrication of the cutting tool and a jet of air thereafter to effect removal of the cutting chips from the vicinity of the work, said actions being automatically effected by prior predetermined movements of the nozzle to effect suitable location of the nozzle end with respect to the work and carrier location of the waste in separate or simultaneous actions.

FIG. 21 illustrates means for effecting fluid coupling between a carrier or pallet 206 and a machine tool platen or work bed 213 when the carrier is predeterminately located at said machine for operations by the machine on work held by the carrier. Such fluid coupling may be desireable where it is required to operate one or more fluid operated devices mounted on the carrier by fluid pressure provided at the machine at which the carrier is prepositioned as illustrated. Fluid coupling between the carrier and machine may also be necessary if the control of the carrier servos and/or machine tool servos is effected by fluidic devices or a fluid computing arrangement. The carrier or pallet 206 of FIG. 21 has a base 211 and a plurality of side walls one of which 207 is shown in abutment with a vertical wall 215 of the machine tool bed 213. The end wall 207 of the carrier is assembled of a main wall portion 208 and a plate 209 containing a plurality of channels therein defining passageways, one 210 of which is shown extending to the outer surface 209' of said plate which defines the outer surface of the end wall 207 which abuts the surface 215' of the wall 215 of the machine bed when the carrier and bed are in operative alignment with each other as hereinbefore described. Secured within a counterbored portion of passageway 210 is a flexible nozzle 212 which makes sealing engagement with a countersunk cavity leading to a bore or conduit extending through wall 21 and defined by notation 216. The rubber or plastic nozzle 212 is compressed into the cavity 216' when the carrier properly abuts wall 215 effecting sealing engagement therewith so that fluid under pressure may be flowed in either direction between passageways 210 and 216, the latter being connected to a controller or source of fluid pressure through a conduit 218 connected by fluid coupling 217 to the bore 216 in wall 215. The coupling 212 may also contain a one way valve to prevent loss of fluid when uncoupling occurs.

What I claim is:

1. An automatic production system including a plurality of machines and a plurality of workholding carriers, means for transferring said carriers to selected of said tools and predeterminately positioning the carriers at the machines for performing predetermined operations on the work held by the carriers, at least certain of said tools being operative to perform cutting operations on work held by said carriers, means at the cutting machines for directing liquid against the work during the cutting operation, drainage means including an exhaust port associated with the carriers for collecting and directing flow of said liquid to said exhaust port, and receiving means at the machines for receiving liquid from the carrier exhaust port.

2. Apparatus in accordance with claim 1 including further receiving means associated with each carrier for collecting waste products of cutting work held by the carrier and preventing accumulation of said waste at the machines.

3. Apparatus in accordance with claim 2 further comprising automatic means for cleaning said waste from the carrier while away from a machine.

4. An automatic production system comprising a plurality of machine tools defining respective work stations of a production line for performing different operations on work-in-process, each of said machine tools including control means to control operation of said machine tool, an automatic conveying system including guide means for guiding a workpiece carrier along the production line to a predetermined one of said work stations, at least one workpiece carrier located on said guide means and including means to secure a workpiece thereon, variable program control means for storing machining programs and mounted on said carrier, and means at each work station operative upon arrival of said carrier at said predetermined work station for transmitting at least one of the machining programs stored in the program control means on the carrier to said control means to control the machining operations carried out on the workpiece on the carrier by the machine tool at that work station.

5. A work-holding carrier for transport along a path past a plurality of data-controlled machining units operative to perform different operations on work-in-process comprising:
   a. means for securing a workpiece thereon,
   b. reversible drive means connected to said carrier to move said carrier in either direction along said path,
   c. sensing means at each machining unit effective to sense the presence of said carrier at a selected machining unit to which a particular workpiece carried thereby is to be delivered, and to transmit signals, and
   d. control means operatively connected to said drive means and responisve to a signal from said sensing means to control movement and positioning of said carrier along said path at any selected one of said machining units.

6. A work-holding carrier for transport along guide means defining a path past a plurality of data-controlled machining units, each capable of performing machining operations according to a dictated program comprising
   a. means for securing a workpiece on said carrier,
   b. means on said carrier adapted to cooperate with said guide means during travel of said carrier along said path, and
   c. control means mounted on said carrier to control the movement of said carrier along said path to those selected machining units required to perform machining operations on the particular workpiece being carrier by said carrier,
   d. said control means comprising programming means including a plurality of machining programs for controlling each of said selected machining units and an output for connection to each said selected machining unit to dictate at least one selected machining program to a selected one of said machining units to control the machining operations carried out by said selected machining unit on the workpiece on said carrier.

7. A work-holding carrier for transport along guide means defining a path to a plurality of data-controlled machining units, each capable of performing machining operations according to a dictated program comprising
   a. means on said carrier for positioning and securing workpieces on said carrier,
   b. means on said carrier cooperating with said guide means during travel of said carrier along said path, and
   c. programming means mounted on said carrier and including a plurality of machining programs for controlling selected of said machining units and an output for connection to each of said selected machining units to dictate at least one machining program to said selected machining unit to control the machining operations carried out by said selected machining unit on the workpiece on said carrier.

8. In a production system a plurality of data-controlled machining units arranged along a path and operative to perform different operations on work-in-process, means to convey variable program control means along said path to and from any of said machining units, variable program control means on said conveying means for storing machining programs to control the machining operation of at least one of said machining units, and output means connected to each of said machining units and operative upon arrival of said control means at one of said machining units for transmitting a selected machining program stored in the program control means from said program control means to said one machining unit to control the machining operations of that one machining unit.

9. In a production system a plurality of data-controlled machining units arranged along a path and operative to perform different operations on work-in-process, means to convey workpiece holders and variable program control means along said path to and from any of the machine units, variable program control means on said conveying means for storing machining programs to control the machining operations of at least one of said machining units, and output means connected to each of said machining units and operative upon arrival of said control means at any selected one of said machining units for transmitting a selected machining program stored in the program control means from said program control means to said one machining unit to control the machining operations of that one machining unit.

10. A production system as claimed in claim 9 wherein said variable program control means includes means for controlling the movement of said control means by said conveyor means along said path for delivering said control means to selected of said machining units.

11. In a machine tool production line with plural machine tools spaced along a work advancing conveyor; workholders fixed to said conveyor, data storage means connected to said workholders for controlling and programing the movement functions of the machines, means operatively connected to each of said machine tools responsive to the data in said data storage means for controlling the machine functions, and means operatively connected to said conveyor for indexing said workholders and data storage means from machine tool to machine tool along said conveyor.

12. A machine tool transfer line, comprising: conveyor means, a plurality of work carrying means on said conveyor. drive means operatively connected to said conveyor for indexing said work carrying means from station to station along said conveyor, a plurality of machine tools spaced along said conveyor at said stations, control means in each machine responsive to data for controlling the machine functions, a central source of data connectable through data transmitting means to said control means and representing the desired functions of each machine along the conveyor, means at each of said stations for sensing the position of the work carrying means along said conveyor, and means connectable between said central source of data and said control means and responsive to said work carrying sensing means for transmitting the data from said central source to each of said control means.

13. A machine tool transfer line, comprising: conveyor means, a plurality of work carrying means on said conveyor drive means operatively connected to said conveyor for indexing said work carrying means from station to station along said conveyor, a plurality of machine tools spaced along said conveyor at said stations, control means in each machine responsive to data for controlling the machine functions, a central source of data connectable through data transmitting means to said control means, said central source of data containing a program for each machine, each program containing data corresponding to the functions of each machine, means at each of said stations for sensing the position of at least one of said work carrying means as it indexes from station to station along the conveyor, and means connectable between said central source of data and said control means and responsive to said work carrying means sensing means for transmitting the program data to each of said control means, said transmitting means being constructed to transmit data from the data source to the control means associated with the machine adjacent the sensed work carrying means, so that complete program data is transmitted to the control means sequentially as the sensed work carrying means is indexed along the conveyor from station to station.

14. A machine tool transfer line, comprising: conveyor means, a plurality of work carrying means on said conveyor, drive means operatively connected to said conveyor for indexing said work carrying means from station to station along said conveyor, a plurality of machine tools spaced along said conveyor at said stations, control means in each machine responsive to data for controlling the machine functions, a central source of data connectable through data transmitting means to said control means and representing the desired functions of each machine along the conveyor, means at each of said stations for sensing the position of the work carrying means along said conveyor, and means connectable between said central source of data and said control means and responsive to said work carrying sensing means for transmitting the data from said central source to each of said control means.

15. In a machine tool production line a plurality of machine tools spaced along a work advancing conveyor; workholders on said conveyor and adapted to be advanced from one machine tool to another by said conveyor, data storage means connectable through data transmitting means to said machine tools for controlling and programing the movement functions of the machines, means connecting said data storage means with said conveyor for advancing said data storage means from machine tool to machine tool, and means at each of said machine tools and connectable with said data storage means for transmitting the data in said data storage means to said machine tool and controlling the machine function of said machine tool.

16. In a machine tool production line as defined in claim 15, and further including automatic means for bringing said transmitting means into operative relationship with said data storage means when the data storage means are indexed adjacent the transmitting means by the conveyor, said transmitting means being adapted to automatically transmit the data in said data storage means, and each machine tool including control means responsive to said data for controlling the movements of the associated machine tool in accordance with the program data on said data storage means.

17. An automatic production apparatus comprising
a. a plurality of power operated machines located at stations along a path;
b. conveyor means for simultaneously transporting a plurality of individual work carrier means along said path to said stations;
c. a plurality of individual work carrier means located on said conveyor for transferring work to selected of said machines;
d. command control means arranged for operative connection to said machines for selectively operating said machines to variably control each machine to perform programed operations on work held by each carrier means when said carrier means is situated at a station and prepositioned with repsect to a respective machine;
e. said command control means including a record member on each of said carrier means, each record member containing a plurality of command control recordings, each recording defining a control message and selected of said messages being operative for variably controlling selected of said machines to each perform a series of selected operations on the work held by the carrier means in accordance with said selected messages;
f. at least one photoelectric reading means at each machine for reading selected recordings on said record member and each operative to generate an output signal when the carrier means is predeterminately located with respect to an associated machine for controlling said associated machine to perform preprogramed operations on work held by the carrier in accordance with the recordings read thereby;
g. means at each station for predeterminately positioning each of said work carrier means with respect to those machines of said plurality of machines to be controlled by the command control means;
h. means at each station for operatively connecting the output of each of said photoelectric reading means with an associated machine when reading a selected recording on said record member to predeterminately control the machine; and
i. means at each station operative upon the completion of operations by any machine on work held by the carrier means for initiating movement of the carrier means along said path to the next machine to be controlled in its operation on work held by the carrier.

18. An automatic production apparatus comprising
a. a plurality of power operated machines located at stations along a path;
b. conveyor means for simultaneously transporting a plurality of individual work carrier means along said path to said stations;
c. a plurality of individual work carrier means located on said conveyor for transferring work to selected of said machines;
d. command control means arranged for operative connection to said machines for selectively operating said machines to variably control each machine to perform programed operations on work held by each carrier means when said carrier means is situated at a station and prepositioned with respect to a respective machine;
e. said command control means including a record member on each of said carrier means, each record member containing a plurality of command control recordings, each recording defining a control message and selected of said messages being operative for variably controlling selected of said machines to each perform a series of selected operations on the work held by the carrier means in accordance with said selected messages;
f. means at each station for predeterminately positioning each of said work carrier means with respect to those machines of said plurality of machines to be controlled by the command control means;
g. coupling means on each of said carriers and machines, said coupling means comprising electromechanical means and a servo device operative to actuate a device aligned therewith upon predeterminately positioning the carrier at a machine, said coupling means further comprising a modulatable variable radiation generating means supported on each of said carriers and receiving means associated with each machine for detecting variations in radiation of said generating means; and
h. means at each station operative upon the completion of operations by any machine on work held by the carrier means for initiating movement of the carrier means along said path to the next machine to be controlled in its operation on work held by the carrier.

19. Apparatus in accordance with claim 18 wherein said radiation generating means is an intensity variable light source and control means for modulating said light source, and said receiving means comprising photoelectric transducer means operative to receive light from said light source and produce an electrical output signal which varies with variations in the intensity of said light source for controlling the associated machine.

20. An automatic production apparatus comprising
a. a plurality of power operated machines located at stations along a path;
b. conveyor means for simultaneously transporting a plurality of individual work carrier means along said path to said stations;
c. a plurality of individual work carrier means located on said conveyor for transferring work to selected of said machines;
d. command control means arranged for operative connection to said machines for selectively operating said machines to variably control each machine to perform programed operations on work held by each carrier means when said carrier means is situated at a station and prepositioned with respect to a respective machine;
e. said command control means including a record member on each of said carrier means, each record member containing a plurality of command control recordings, each recording defining a control message and selected of said messages being operative for variably controlling selected of said machines to each perform a series of selected operations on the work held by the carrier means in accordance with said selected messages;
f. a plurality of reading means for reading selected recordings on said record member including at least one reading means at each machine and each operative to generate a selected message when the carrier means is predeterminately located with respect to a selected machine;
g. means at each station for predeterminately positioning each of said work carrier means with respect to those machines of said plurality of machines to be controlled by the command control means;
h. fluid coupling means disposed on each of said carriers and machines and respective fluid conduits extending from fluid devices on said machines and carriers connected to said coupling means;
i. means at each station for operatively connecting the output of each of said reading means with an associated machine when reading a selected recording on said record member to predeterminately control the machine; and
j. means at each station operative upon the completion of operations by any machine on work held by the carrier means for initiating movement of the carrier means along said path to the next machine to be controlled in its operation on work held by the carrier.

21. An automatic production apparatus comprising
a. a plurality of power operated machines located at stations along a path;
b. conveyor means for simultaneously transporting a plurality of individual work carrier means along said path to said stations;
c. a plurality of individual work carrier means located on said conveyor for transferring work to selected of said machines;
d. command control means arranged for operative connection to said machines for selectively operating said machines to variably control each machine to perform programed operations on work held by each carrier means when said carrier means is situated at a station and prepositioned with respect to a respective machine;
e. said command control means including a record member on each of said carrier means, each record member containing a plurality of command control recordings, each recording defining a control message and selected of said messages being operative for variably controlling selected of said machines to each perform a series of selected operations on the work held by the carrier means in accordance with said selected messages;
f. a plurality of reading means for reading selected recordings on said record member including at least one reading means at each machine and each operative to generate a selected message when the carrier means is predeterminately located with respect to a selected machine;
g. said recordings comprising record elements having a plurality of holes in coded array and said reading means comprising fluid amplifier reading means to fluidically sense said holes, said command control means being operative to receive the fluid signals generated by sensing said recordings and effect control of said carrier and machine;
h. means at each station for predeterminately positioning each of said work carrier means with respect to those machines of said plurality of machines to be controlled by the command control means;
i. means at each station for operatively connecting the output of each of said reading means with an associated machine when reading a selected recording on said record member to predeterminately control the machine; and
j. means at each station operative upon the completion of operations by any machine on work held by the carrier means for initiating movement of the carrier means along said path to the next machine to be controlled in its operation on work held by the carrier.

22. A work supporting device for supporting a workpiece adjacent a machine which performs operations on the workpiece comprising: a workholder, means on the workholder for fixing a workpiece thereto, and numerical program data means on the workholder for controlling the operations of the machine on the workpiece.

23. A work supporting device for carrying a workpiece between a plurality of machine tool stations where operations are performed on the workpiece comprising: a workholder, means on the workholder for locating and fixing a workpiece thereon, and a plurality of programs on said workholder; each adapted to control and program the operations to be performed at one of the machine tool stations.

24. A work supporting device for carrying a workpiece from one machine station to another, comprising: a workholder, means on the workholder for fixing a workpiece thereto, a plurality of programs on said workholder, each adapted to command the operations to be performed at one of the machine stations; and locating means on said workholder adapted to engage a portion of the machine station for locating the workpiece with respect to the machine station.

25. An automated machine tool station, comprising: a machine tool for performing operations on a workpiece, a workholder adapted to support the workpiece and located adjacent the machine tool, means on the workholder for locating and fixing a workpiece thereto, numerical data program means on the workholder for controlling and programing the operations and function of the machine tool while performing operations on the workpiece, and control means on said machine tool connectable to said program means and responsive to said numerical data program means for controlling a plurality of machine functions.

26. An automated production line wherein workpieces of a different character are transferred from one machine station to another, comprising: a conveyor for advancing the workpieces; a plurality of machine tools spaced along said conveyor; a plurality of workholders on said conveyor adapted to be advanced thereby from one machine tool to another, means on each of said workholders for locating and fixing a workpiece thereon, a plurality of programs on said workholders, each program being adapted to command the functions of one of the machine tools, locating means on each of the workholders adapted to engage corresponding locating means adjacent each of the machine tools to align the workpieces with respect to the machine tools; and control means on each of the machine tools responsive to said programs for controlling a plurality of the functions thereof.

27. An automated production line in which workpieces of the same and different character are transferred from one machine station to another comprising: conveyor means extending along a predetermined path, a plurality of machine tools spaced along said conveyor means, a plurality of workholders on said conveyor means adapted to be advanced thereby from one machine tool to another, means on each of said workholders for locating and fixing a workpiece thereon, numerical program data means for controlling selected machine tools, said numerical program data means being arranged to be indexed with said workholders by said conveyor means from one machine tool to another, and means for connecting said machine tools to said numerical program data means for transferring data.

* * * * *

UNITED STATES PATENT OFFICE
CERTIFICATE OF CORRECTION

Patent No. 3,854,889     Dated December 17, 1974

Inventor(s) Jerome H. Lemelson

It is certified that error appears in the above-identified patent and that said Letters Patent are hereby corrected as shown below:

On the title page, column 1, lines 4 and 5 are changed to read as follows:

-- Assignee: Molins Limited
             London, England --

Signed and sealed this 1st day of April 1975.

(SEAL)
Attest:

RUTH C. MASON
Attesting Officer

C. MARSHALL DANN
Commissioner of Patents
and Trademarks